United States Patent
Li et al.

(10) Patent No.: US 11,799,561 B2
(45) Date of Patent: Oct. 24, 2023

(54) RECEIVER OPTICAL SUB-ASSEMBLY, COMBO BI-DIRECTIONAL OPTICAL SUB-ASSEMBLY, COMBO OPTICAL MODULE, OLT, AND PON SYSTEM

(71) Applicant: Huawei Technologies Co., Ltd., Shenzhen (CN)

(72) Inventors: Shu Li, Dongguan (CN); Rixiang Cao, Dongguan (CN); Zelin Wang, Dongguan (CN); Sulin Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/506,266

(22) Filed: Oct. 20, 2021

(65) Prior Publication Data

US 2022/0045767 A1 Feb. 10, 2022

Related U.S. Application Data

(63) Continuation of application No. 16/909,124, filed on Jun. 23, 2020, now Pat. No. 11,184,088, which is a continuation of application No. PCT/CN2018/124461, filed on Dec. 27, 2018.

(30) Foreign Application Priority Data

Dec. 27, 2017 (CN) .......................... 201711456316.1

(51) Int. Cl.
*H04B 10/27* (2013.01)
*H04B 10/66* (2013.01)
*H04B 10/25* (2013.01)
*H04J 14/02* (2006.01)
*H04Q 11/00* (2006.01)

(52) U.S. Cl.
CPC ......... *H04B 10/66* (2013.01); *H04B 10/2589* (2020.05); *H04B 10/27* (2013.01); *H04J 14/02* (2013.01); *H04Q 11/0067* (2013.01)

(58) Field of Classification Search
CPC .... H04B 10/66; H04B 10/27; H04B 10/2589; H04J 14/02
See application file for complete search history.

(56) References Cited

U.S. PATENT DOCUMENTS

| 8,805,191 B2 | 8/2014 | Ho et al. |
|---|---|---|
| 11,184,088 B2 * | 11/2021 | Li .......................... H04J 14/02 |
| 2003/0215240 A1 | 11/2003 | Grann et al. |

(Continued)

FOREIGN PATENT DOCUMENTS

| CN | 201413414 Y | 2/2010 |
|---|---|---|
| CN | 202159164 U | 3/2012 |

(Continued)

*Primary Examiner* — Dzung D Tran
(74) *Attorney, Agent, or Firm* — Conley Rose, P.C.

(57) ABSTRACT

A receiver optical sub-assembly, a combo bi-directional optical sub-assembly, a combo optical module, an optical line terminal, and a passive optical network system, where the receiver optical sub-assembly includes a first transistor-outline can, where a light incident hole is disposed on the first transistor-outline can, and where a first demultiplexer, a first optical receiver, a second optical receiver, and an optical lens combination are packaged in the first transistor-outline can.

20 Claims, 14 Drawing Sheets

(56) References Cited

U.S. PATENT DOCUMENTS

| | | | |
|---|---|---|---|
| 2017/0090121 A1 | 3/2017 | Wang et al. | |
| 2017/0134099 A1 | 5/2017 | Hara et al. | |
| 2017/0176698 A1* | 6/2017 | Ho | G02B 6/4215 |
| 2017/0343716 A1* | 11/2017 | Wan | G01S 7/4812 |
| 2018/0306987 A1 | 10/2018 | Li et al. | |
| 2020/0012055 A1* | 1/2020 | Ye | H04J 14/0256 |

FOREIGN PATENT DOCUMENTS

| | | |
|---|---|---|
| CN | 105301711 A | 2/2016 |
| CN | 105515675 A | 4/2016 |
| CN | 106788754 A | 5/2017 |
| CN | 106888066 A | 6/2017 |
| CN | 107360481 A | 11/2017 |
| CN | 107462956 A | 12/2017 |
| EP | 3389199 A1 | 10/2018 |
| JP | H08201666 A | 8/1996 |
| JP | 2009290097 A | 12/2009 |
| JP | 2016212409 A | 12/2016 |
| WO | 2017106668 A1 | 6/2017 |
| WO | 2017113227 A1 | 7/2017 |

* cited by examiner

RECEIVER OPTICAL SUB-ASSEMBLY, COMBO BI-DIRECTIONAL OPTICAL SUB-ASSEMBLY, COMBO OPTICAL MODULE, OLT, AND PON SYSTEM

CROSS-REFERENCE TO RELATED APPLICATIONS

This application is a continuation of U.S. patent application Ser. No. 16/909,124, filed on Jun. 23, 2020, which is a continuation of International Patent Application No. PCT/CN2018/124461, filed on Dec. 27, 2018, which claims priority to Chinese Patent Application No. 201711456316.1, filed on Dec. 27, 2017. All of the aforementioned patent applications are hereby incorporated by reference in their entireties.

TECHNICAL FIELD

This application relates to the field of optical communications technologies, and in particular, to a receiver optical sub-assembly, a combo bi-directional optical sub-assembly, a combo optical module, an optical line terminal, and a passive optical network system.

BACKGROUND

With the development of modern society, explosive growth of information volume, and especially the advent of a big data era, there are growing requirements on a network throughput capability. With unique features such as ultra-high bandwidth and low electromagnetic interference, optical transmission has gradually become a mainstream solution for modern communication. In particular, new networks at the present stage, for example, an access network represented by fiber to the home, are being deployed on a large scale.

An optical communications network applied to an access network scenario mainly exists in a form of a passive optical network (PON). Accompanied with wide adoption of the optical network, a large quantity of PON networks are deployed, and a large quantity of communications devices are required. A related communications device such as an optical line terminal (OLT) mainly includes an optical module, a board on which the optical module is disposed, and a subrack. As shown in FIG. 1, one optical module in an optical line terminal 01 corresponds to one optical distribution network (ODN) 02, and serves a specific quantity of optical network units (ONUs) 03. In FIG. 1, the optical distribution network 02 corresponds to x optical network units 03 (ONU 1 to ONU χ), and each optical network unit 03 may represent one user. As essential components in the optical network, optical modules in the optical line terminal 01 and the optical network unit 03 are responsible for performing optical-to-electrical conversion and transmission on a network signal, and underlie normal communication of the network.

Currently, the PON network that is deployed on a large scale includes two types: an Ethernet Passive Optical Network (EPON) and a gigabit-capable passive optical network (GPON). The two types of optical networks support a rate of 2.5 gigabits per second (Gbit/s) or 1.25 Gbit/s. With an upgrade of network bandwidth, a to-be-deployed next-generation network is a 10G-EPON and a 10G-GPON (also referred to as XGPON), and supports a rate of 10 Gbit/s. The GPON is used as an example in the following for description. The same holds true for the EPON scenario. With respect to a wavelength of an optical signal, an optical line terminal in the GPON uses a 1490-nanometer wavelength for sending and a 1310-nanometer wavelength for receiving, and an optical line terminal in the XGPON uses a 1577-nanometer for sending and a 1270-nanometer for receiving. Assuming that the current GPON network is upgraded to the 10G PON, it is unlikely to reconstruct an ODN network. Therefore, when service expansion needs to be performed on the current network, the following scenario certainly exists: On the user side, some users want an upgrade to the XGPON, and some users do not. Consequently, a case shown in FIG. 2 occurs: In the same optical distribution network 02, both a GPON service and an XGPON service exist. As shown in FIG. 2, optical modules in some optical network units 03 are GPON optical modules, and optical modules in other optical network units 03 are XGPON optical modules. This raises an issue of coexistence of XGPON optical sub-assemblies and a huge quantity of previous GPON sub-assemblies. On the side of the optical line terminal 01, the two types of OLT optical modules: the GPON optical module and the XGPON optical module are both required. In such a networking environment, a wavelength-division multiplexing (WDM) module 04 is used to multiplex upstream and downstream wavelengths of the GPON and the XGPON. However, in actual application, if the WDM module 04 is disposed externally, as shown in FIG. 2, construction costs are high, large equipment room space is occupied, construction and cabling are complex, and management and maintenance are difficult.

SUMMARY

Embodiments of this application provide a receiver optical sub-assembly, a transmitter optical sub-assembly, a combo bi-directional optical sub-assembly, a combo optical module, an optical line terminal, and a passive optical network system, to multiplex upstream and downstream wavelengths, and therefore reduce construction costs, save equipment room space, simplify construction and cabling, and facilitate management and maintenance.

To achieve the foregoing objectives, the following technical solutions are used in the embodiments of this application.

According to a first aspect, this application provides a receiver optical sub-assembly, including a first transistor-outline can, where a light incident hole is disposed on the first transistor-outline can, and where a first demultiplexer, a first optical receiver, a second optical receiver, and an optical lens combination are packaged in the first transistor-outline can. Light enters the first demultiplexer through the light incident hole, and the first demultiplexer is configured to transmit an optical signal of a first wavelength and reflect an optical signal of a second wavelength. The first optical receiver is disposed on a transmission optical path of the first demultiplexer, and the first optical receiver is configured to receive the optical signal of the first wavelength. The optical lens combination is disposed on a reflection optical path of the first demultiplexer, and the optical lens combination is configured to guide, to the second optical receiver, the optical signal of the second wavelength that is reflected by the first demultiplexer. Additionally, the second optical receiver is configured to receive the optical signal of the second wavelength.

According to the receiver optical sub-assembly provided in the embodiments of this application, the first optical receiver in the receiver optical sub-assembly can receive the optical signal of the first wavelength, the second optical receiver can receive the optical signal of the second wavelength, and the first demultiplexer is configured to transmit the optical signal of the first wavelength and reflect the optical signal of the second wavelength. In this way, upstream optical signals of different wavelengths are separated, such that the upstream optical signals can be demultiplexed and received. In addition, the first demultiplexer is disposed in the receiver optical sub-assembly, that is, the built-in demultiplexer is implemented. In this way, construction costs are reduced, equipment room space is saved, construction and cabling are simple, and convenient management and maintenance are implemented. In addition, a transistor-outline (TO) can is used for packaging, and therefore is compatible with an existing TO packaging process. This avoids a complex tailored housing, and reduces manufacturing costs.

In a possible implementation, the optical lens combination includes a refractor and at least one reflector. The refractor is disposed on the reflection optical path of the first demultiplexer, and the optical signal of the second wavelength that is refracted by the refractor enters the second optical receiver after being successively reflected by the reflectors. When an included angle between the reflection optical path of the first demultiplexer and an incident optical path of the first demultiplexer is relatively small, the refractor may be disposed along an approximately vertical direction that is close to the incident optical path of the first demultiplexer. In this way, after entering the refractor, an optical signal reflected by the first demultiplexer deflects in a direction away from the incident optical path of the first demultiplexer, such that there is sufficient space to dispose the reflector.

In a possible implementation, the reflector includes a first reflector and a second reflector. The refractor is disposed on the reflection optical path of the first demultiplexer, the first reflector is disposed on a refraction optical path of the refractor, the second reflector is disposed on a reflection optical path of the first reflector, and a reflection optical path of the second reflector is parallel to the transmission optical path of the first demultiplexer and coincides with a receiving optical path of the second optical receiver. Therefore, the first optical receiver and the second optical receiver can be disposed on a same side. This is more in line with an existing TO package structure, and has a more compact structure. In addition, it is ensured that receiving optical paths of the two optical receivers can be vertically coupled, and coupling efficiency is improved.

In a possible implementation, a first condenser lens and a first filter are sequentially disposed on a receiving optical path of the first optical receiver in a light incident direction of the first optical receiver. Additionally, a second condenser lens and a second filter are sequentially disposed on a receiving optical path of the second optical receiver in a light incident direction of the second optical receiver. In this way, light concentration and filtering can be implemented, to prevent impact of other stray light on an optical signal.

In a possible implementation, the optical lens combination is an integrated optical prism. A refraction surface, a first reflection surface, and a second reflection surface are disposed on the optical prism, where the refraction surface is disposed on the reflection optical path of the first demultiplexer, where the first reflection surface is disposed on a refraction optical path of the refraction surface, where the second reflection surface is disposed on a reflection optical path of the first reflection surface, and where a reflection optical path of the second reflection surface coincides with the receiving optical path of the second optical receiver. The optical lens combination is integrated on one optical prism, such that a structure is compact, and installation and manufacturing are easier.

In a possible implementation, the first condenser lens is a first light concentrating surface on a surface of the optical prism, the second condenser lens is a second light concentrating surface on the surface of the optical prism, the first light concentrating surface corresponds to the first optical receiver, and the second light concentrating surface corresponds to the second optical receiver. In this way, the first condenser lens and the second condenser lens may be integrated on the optical prism, and an overall structure is more compact.

In a possible implementation, the first filter and the second filter are inserted into the optical prism, the first filter is located between the first light concentrating surface and the first optical receiver, and the second filter is located between the second light concentrating surface and the second optical receiver. Therefore, the filter can be easily installed.

In a possible implementation, the optical prism includes support legs, and the first filter and the second filter are inserted into the support legs of the optical prism.

In a possible implementation, both the first filter and the second filter are 0-degree filters.

In a possible implementation, both the first reflector and the second reflector are total reflectors. In this way, attenuation of the optical signal can be prevented.

In a possible implementation, both the first optical receiver and the second optical receiver are photodiodes. In this way, the optical signal of the first wavelength and the optical signal of the second wavelength may be converted into an electrical signal for output.

In a possible implementation, there is an installation surface on the optical prism, the first demultiplexer is fastened on the installation surface, and the reflection optical path of the first demultiplexer passes through the refraction surface. In this way, the first demultiplexer may be fastened on the optical prism, to improve utilization of installation space.

In a possible implementation, the first transistor-outline can includes a header and a cap disposed on the header, the optical prism is fastened on the header, installation space exists between the optical prism and the header, and the first optical receiver and the second optical receiver are disposed in the installation space and are securely connected to the header. In this way, installation space can be saved.

In a possible implementation, the header is connected to pins, and the first optical receiver and the second optical receiver are connected to the pins using an amplifier. Therefore, electrical signals generated after optical-to-electrical conversion by the first optical receiver and the second optical receiver may be amplified, such that the electrical signals are strengthened for output.

In another possible implementation, the optical lens combination includes at least one reflector, and the optical signal of the second wavelength that is reflected by the first demultiplexer enters the second optical receiver after being successively reflected by the reflectors.

In a possible implementation, the optical lens combination includes a third reflector, and the third reflector is disposed on the reflection optical path of the first demultiplexer. In this way, an optical path is shorter, and a smaller signal loss is caused.

In a possible implementation, the first optical receiver and the second optical receiver are disposed side by side, and a reflection optical path of the third reflector is parallel to the transmission optical path of the first demultiplexer and coincides with the receiving optical path of the second optical receiver.

In a possible implementation, a third condenser lens and a third filter are sequentially disposed on the receiving optical path of the first optical receiver in the light incident direction of the first optical receiver, and a fourth condenser lens and a fourth filter are sequentially disposed on the receiving optical path of the second optical receiver in the light incident direction of the second optical receiver. In this way, light concentration and filtering can be implemented, to prevent impact of other stray light on an optical signal.

In a possible implementation, a transparent support is further included, where the transparent support includes a bottom plate and a roof plate. The first demultiplexer is fastened on the bottom plate, the third reflector is fastened on the roof plate and is located on the reflection optical path of the first demultiplexer, and the first optical receiver and the second optical receiver are disposed on the bottom surface of the bottom plate. Therefore, the first demultiplexer and the third reflector may be fastened to a same transparent support, such that a structure is compact.

In a possible implementation, a transparent support is further included, where the transparent support includes a first support plate and a second support plate. The first support plate and the second support plate are disposed at an interval, and the third reflector is disposed over the first support plate and the second support plate. Therefore, after being split by the first demultiplexer, a part of received light is directly transmitted and enters the first optical receiver. The other part of the received light is reflected by the first demultiplexer and is incident to the third reflector through a gap between the first support plate and the second support plate, and then is reflected by the third reflector and enters the second optical receiver along the receiving optical path of the second optical receiver. In an embodiment, the first support plate and the second support plate may be made of a transparent material, or may be made of an opaque material.

In a possible implementation, the third condenser lens is a third light concentrating surface on the bottom surface of the bottom plate, and the fourth condenser lens is a fourth light concentrating surface on the bottom surface of the bottom plate. The third light concentrating surface corresponds to the first optical receiver, and the fourth light concentrating surface corresponds to the second optical receiver.

In a possible implementation, the third filter and the fourth filter are inserted into the transparent support. The third filter is located between the third light concentrating surface and the first optical receiver, and the fourth filter is located between the fourth light concentrating surface and the second optical receiver.

In a possible implementation, the transparent support includes support legs, and the third filter and the fourth filter are inserted into the support legs of the transparent support.

In a possible implementation, the first transistor-outline can includes the header and the cap disposed on the header, the transparent support is fastened on the header, and installation space exists between the transparent support and the header. Additionally, the first optical receiver and the second optical receiver are disposed in the installation space and are securely connected to the header. In this way, installation space can be saved.

In a possible implementation, the optical signal of the first wavelength is an optical signal of a 1310-nanometer (nm) wavelength, and the optical signal of the second wavelength is an optical signal of a 1270-nm wavelength. Alternatively, the optical signal of the first wavelength is an optical signal of a 1270-nm wavelength, and the optical signal of the second wavelength is an optical signal of a 1310-nm wavelength. In this way, optical signals of the GPON and the XGPON can be received.

According to a second aspect, this application provides a transmitter optical sub-assembly, including a second transistor-outline can, where an out-light hole is disposed on the second transistor-outline can, where a multiplexer, a first optical transmitter, and a second optical transmitter are packaged in the second transistor-outline can, where the first optical transmitter can send an optical signal of a third wavelength, and where the second optical transmitter can send an optical signal of a fourth wavelength. The optical multiplexer is located on sending optical paths of the first optical transmitter and the second optical transmitter, and the optical multiplexer can combine the optical signal of the third wavelength and the optical signal of the fourth wavelength and send a combined optical signal to the out-out-light hole.

According to the transmitter optical sub-assembly provided in the embodiments of this application, the first optical transmitter can send the optical signal of the third wavelength, the second optical transmitter can send the optical signal of the fourth wavelength, and the multiplexer can combine the optical signal of the third wavelength and the optical signal of the fourth wavelength for sending. In this way, downstream optical signals can be multiplexed and sent. In addition, the multiplexer is disposed in the transmitter optical sub-assembly, and therefore an external multiplexer is not required. In this case, construction costs are reduced, equipment room space is saved, construction and cabling are simple, and convenient management and maintenance are implemented. In addition, the transistor-outline can is used for packaging, and therefore is compatible with the existing TO packaging process. This avoids a complex tailored housing, and reduces manufacturing costs.

In a possible implementation of the second aspect, the multiplexer is a waveguide multiplexer. The waveguide multiplexer includes a first input terminal, a second input terminal, and an output terminal. Coupling and matching is performed on the first input terminal and the first optical transmitter, and coupling and matching is performed on the second input terminal and the second optical transmitter. The output terminal corresponds to the out-light hole on the second transistor-outline can.

In a possible implementation of the second aspect, the first input terminal and the second input terminal are respectively located on two opposite side walls of the waveguide multiplexer and are perpendicular to an out-light direction of the output terminal. The sending optical path of the first optical transmitter and the sending optical path of the second optical transmitter are disposed in the out-light direction of the output terminal in a staggered manner. Therefore, installation space can be saved, and mutual interference between light emitted by the first optical transmitter and light emitted by the second optical transmitter can be prevented.

In another possible implementation of the second aspect, the optical multiplexer is a slide multiplexer, and the slide multiplexer can transmit the optical signal of the third wavelength and can reflect the optical signal of the fourth wavelength. The first optical transmitter and the second optical transmitter are disposed side by side. Both the slide multiplexer and the out-light hole are located on the sending optical path of the first optical transmitter. A fourth reflector is disposed on the sending optical path of the second optical transmitter, and the fourth reflector may reflect, to the slide multiplexer, the optical signal of the fourth wavelength that is emitted by the second optical transmitter. The slide multiplexer can combine the optical signal of the third wavelength and the optical signal of the fourth wavelength, and send a combined optical signal to the out-light hole. The structure in which the slide multiplexer is used may enable the first optical transmitter and the second optical transmitter to be disposed side by side, to adapt to the existing TO packaging process.

In a possible implementation of the second aspect, a collimation lens is disposed at the out-light hole. In this way, light can be emitted in a straight line from the out-light hole, to prevent an optical signal from a direction deviation.

In a possible implementation of the second aspect, a first collimation lens is disposed between the first optical transmitter and the multiplexer, and a second collimation lens is disposed between the second optical transmitter and the multiplexer. In this way, light can be emitted in a straight line from the first optical transmitter and the second optical transmitter, to prevent an optical signal from a direction deviation.

In a possible implementation of the second aspect, the first optical transmitter and the second optical transmitter are laser diodes.

In a possible implementation of the second aspect, the first optical transmitter or the second optical transmitter is a cooled laser, and the cooled laser is connected to a temperature controller. In this way, an operating temperature of the cooled laser may be adjusted.

In a possible implementation of the second aspect, the first optical transmitter and the second optical transmitter are connected to a Monitor Photo-diode (MPD), and the monitor photodiode is configured to monitor operating statuses of the first optical transmitter and the second optical transmitter.

In a possible implementation of the second aspect, the optical signal of the third wavelength is an optical signal of a 1577-nm wavelength, and the optical signal of the fourth wavelength is an optical signal of a 1490-nm wavelength. Alternatively, the optical signal of the third wavelength is an optical signal of a 1490-nm wavelength, and the optical signal of the fourth wavelength is an optical signal of a 1577-nm wavelength. In this way, optical signals of the GPON and the XGPON can be sent.

According to a third aspect, this application further provides a combo bi-directional optical sub-assembly, including: a housing where an optical transmission channel is disposed; a second demultiplexer disposed on the optical transmission channel; an optical receive port, an optical transmit port, and an optical fiber connection port in communication with the optical transmission channel and disposed in the housing; and a receiver optical sub-assembly, where the receiver optical sub-assembly is the receiver optical sub-assembly according to any technical solution of the first aspect, and where the receiver optical sub-assembly is packaged at the optical receive port.

The second demultiplexer can reflect, to the optical receive port, an optical signal of a first wavelength and an optical signal of a second wavelength that enter from the optical fiber connection port.

According to a fourth aspect, this application provides a combo bi-directional optical sub-assembly, including: a housing where an optical transmission channel is disposed; a second demultiplexer disposed on the optical transmission channel; an optical receive port, an optical transmit port, and an optical fiber connection port in communication with the optical transmission channel and disposed in the housing; and a transmitter optical sub-assembly, where the transmitter optical sub-assembly is the transmitter optical sub-assembly according to any technical solution of the second aspect, and where the transmitter optical sub-assembly is packaged at the optical transmit port.

The second demultiplexer can transmit, to the optical fiber connection port, an optical signal of a third wavelength and an optical signal of a fourth wavelength that are emitted by the transmitter optical sub-assembly.

According to a fifth aspect, this application provides a combo bi-directional optical sub-assembly, including: a housing where an optical transmission channel is disposed; a second demultiplexer disposed on the optical transmission channel; an optical receive port, an optical transmit port, and an optical fiber connection port in communication with the optical transmission channel and disposed in the housing; a receiver optical sub-assembly, where the receiver optical sub-assembly is the receiver optical sub-assembly according to any technical solution of the first aspect, and where the receiver optical sub-assembly is packaged at the optical receive port; and a transmitter optical sub-assembly, where the transmitter optical sub-assembly is the transmitter optical sub-assembly according to any technical solution of the second aspect, and where the transmitter optical sub-assembly is packaged at the optical transmit port.

The second demultiplexer can reflect, to the optical receive port, an optical signal of a first wavelength and an optical signal of a second wavelength that enter from the optical fiber connection port, and can transmit, to the optical fiber connection port, an optical signal of a third wavelength and an optical signal of a fourth wavelength that are emitted by the transmitter optical sub-assembly.

According to the combo bi-directional optical sub-assembly provided in the embodiments of this application, the receiver optical sub-assembly is the receiver optical sub-assembly in any technical solution of the first aspect, and the transmitter optical sub-assembly is the transmitter optical sub-assembly in any technical solution of the second aspect. Therefore, the combo bi-directional optical sub-assembly may implement demultiplexing and receiving of upstream optical signals and multiplexing and sending of downstream optical signals. In addition, the housing structure of the combo bi-directional optical sub-assembly is applicable to an existing bi-directional optical sub-assembly (BOSA) package structure, such that a packaging process is easy to implement, manufacturing of complex external tubal body is avoided, and manufacturing efficiency and a yield rate are improved.

In a possible implementation of the fifth aspect, the optical transmission channel includes a first optical channel connecting the optical transmit port and the optical fiber connection port and a second optical channel connecting the optical receive port and the first optical channel. The second demultiplexer is disposed at a junction of the first optical channel and the second optical channel. The optical channel has a simple structure and is in line with an existing BOSA housing manufacturing process. This improves manufacturing efficiency.

In a possible implementation of the fifth aspect, an isolator is disposed in an optical transmission channel between the transmitter optical sub-assembly and the second demultiplexer. The isolator reduces impact of reflected light on performance of the transmitter optical sub-assembly in a network.

According to a sixth aspect, this application provides a combo optical module, including the receiver optical sub-assembly in the first aspect, or the transmitter optical sub-assembly in the second aspect, or an electrical sub-assembly and the combo bi-directional optical sub-assembly in any one of the technical solutions in the third aspect, the fourth aspect, and the fifth aspect, where the electrical sub-assembly is electrically connected to the receiver optical sub-assembly and the transmitter optical sub-assembly in the bi-directional optical sub-assembly.

According to a seventh aspect, this application provides an optical line terminal, including the combo optical module in the technical solution of the sixth aspect.

In a possible implementation of the seventh aspect, the optical line terminal further includes a board that is configured to mount the combo optical module, and a subrack.

According to an eighth aspect, this application provides a passive optical network system, including: an optical line terminal, where the optical line terminal is the optical line terminal in any technical solution of the seventh aspect; an optical distribution network, where the optical distribution network is connected to the optical line terminal; and a plurality of optical network units, where the plurality of optical network units are connected to the optical distribution network.

Optical modules of some optical network units in the plurality of optical network units are GPON optical modules, and optical modules of the other optical network units are XGPON optical modules.

Alternatively, optical modules of some optical network units in the plurality of optical network units are EPON optical modules, and optical modules of the other optical network units are 10G-EPON optical modules.

It may be understood that the optical modules in the plurality of optical network units include at least two of a GPON optical module, an XGPON optical module, a 25G-GPON optical module, and a 50G-GPON optical module. Alternatively, the optical modules in the plurality of optical network units include at least two of an EPON optical module, a 10G-EPON optical module, a 25G-EPON optical module, and a 50G-EPON optical module.

According to the combo optical module, the optical line terminal, and the passive optical network system provided in the embodiments of this application, the combo optical module uses the transmitter optical sub-assembly in the first aspect, the receiver optical sub-assembly in the second aspect, or the combo bi-directional optical sub-assembly in any one of the technical solutions of the third aspect, the fourth aspect, and the fifth aspect. Therefore, the combo optical module can implement demultiplexing and receiving of upstream optical signals and multiplexing and sending of downstream optical signals. In addition, the housing structure of the bi-directional optical sub-assembly in the combo optical module is applicable to an existing BOSA housing structure, such that a manufacturing and packaging process is easy to implement, complex manufacturing of an external tubal body is avoided, and manufacturing efficiency and a yield rate are improved. Therefore, construction costs of the optical transmission module and the passive optical network system are reduced.

DESCRIPTION OF EMBODIMENTS

Embodiments of this application relate to a receiver optical sub-assembly, a transmitter optical sub-assembly, a combo bi-directional optical sub-assembly, a combo optical module, and a passive optical network system. The following briefly describes concepts in the foregoing embodiments.

PON: A PON comprises an optical distribution network (ODN) between an OLT and an ONU, and there is no active electronic device in the ODN.

ODN: An ODN is a fiber-to-the-home network based on PON devices. A function of the ODN is to provide an optical transmission channel between the OLT and the ONU.

WDM: Wavelength division multiplexing refers to a technology in which two or more optical carrier signals (carrying various information) of different wavelengths are combined at a transmit end using a multiplexer, and coupled to a same optical fiber on an optical path for transmission. At a receive end, optical carriers of various wavelengths are separated using a demultiplexer, and then an optical receiver performs further processing to restore an original signal. This technology of simultaneously transmitting two or more optical signals of different wavelengths in a same optical fiber is referred to as wavelength division multiplexing.

Optical transmission module: An optical transmission module is referred to as an optical module for short, and mainly includes two parts: a BOSA and an electrical sub-assembly (ESA). The optical transmission module is formed by electrically connecting a pin of the bi-directional optical sub-assembly to the peripheral electrical sub-assembly (ESA), and then mounting the bi-directional optical sub-assembly and the peripheral electrical sub-assembly into an optical-module housing.

Bi-directional optical sub-assembly (BOSA): A BOSA mainly includes a transmitter optical sub-assembly (TOSA) and a receiver optical sub-assembly (ROSA).

TOSA: A function of the TOSA is to convert an electrical signal into an optical signal, and input the optical signal into an optical fiber for transmission.

ROSA: A function of the ROSA is to receive an optical signal transmitted through an optical fiber, and convert the optical signal into an electrical signal.

Figure 1:
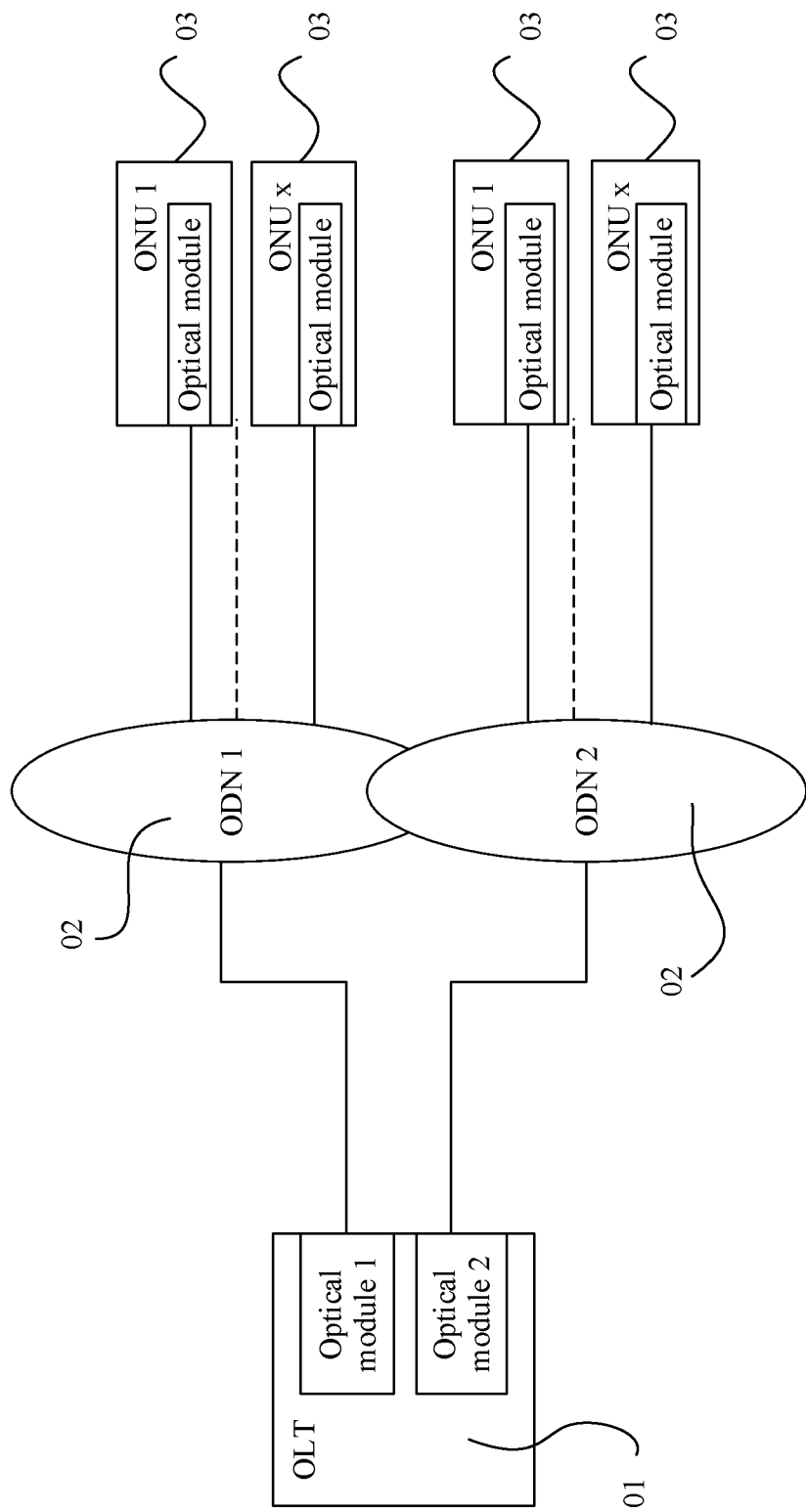
FIG. 1 is a diagram of a network device configuration in a passive optical network.
Figure 2:
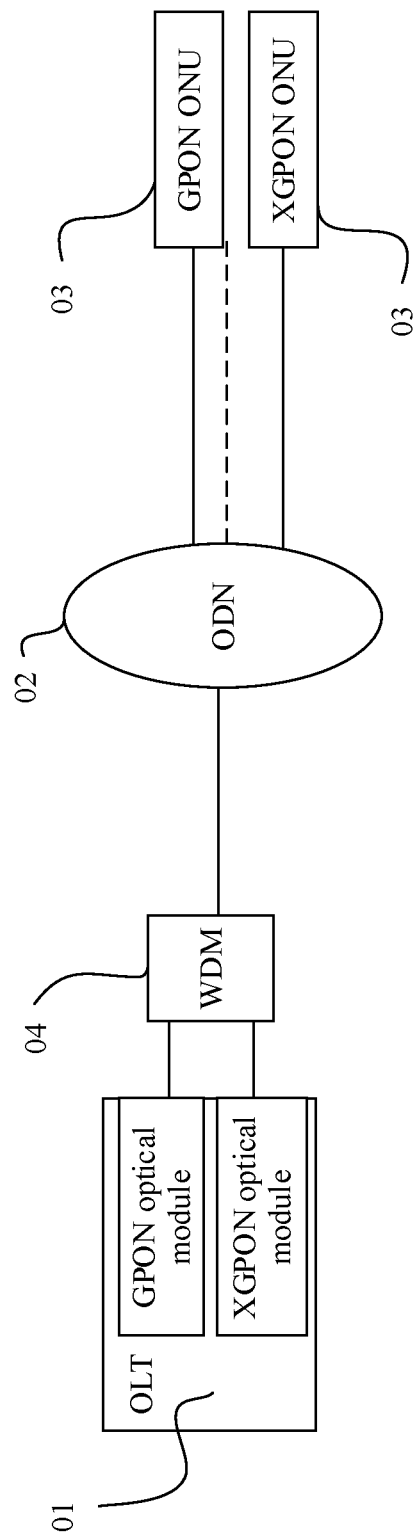
FIG. 2 is a schematic structural diagram of a network device configuration to which an embodiment of this application is applicable to an embodiment of this application.
Figure 3:
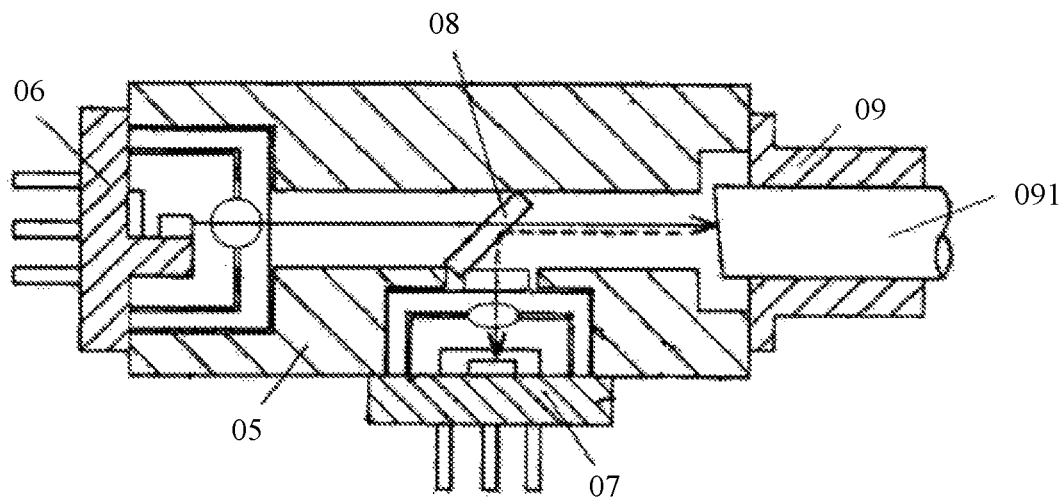
FIG. 3 is a schematic diagram of a typical package structure of a bi-directional optical sub-assembly.

The BOSA is an essential component in the optical module, and may be used to send and receive an optical signal. A typical BOSA structure is shown in FIG. 3, including a housing 05, a built-in TOSA 06 in the housing 05, a ROSA 07, a demultiplexer 08 disposed in the housing 05, and an optical fiber connection ferrule 09 and an optical fiber 091 that are connected to an end of the housing 05. A function of the transmitter optical sub-assembly 06 is to convert an electrical signal into an optical signal, and input the optical signal into the optical fiber 091 for transmission. A function of the receiver optical sub-assembly 07 is to receive an optical signal input from the optical fiber 091, and convert the optical signal into an electrical signal. Generally, because wavelengths of sent and received light are different, the demultiplexer 08 is required in the housing 05 to separate the two wavelengths. A function of the demultiplexer 08 is to transmit light of some wavelengths and reflect light of other wavelengths. A light sending path is shown by the solid line arrow in FIG. 3. Light emitted by the transmitter optical sub-assembly 06 is transmitted through the demultiplexer 08 in a straight line, and then enters the optical fiber 091 for transmission. An optical receiving path is shown by a dashed line arrow in FIG. 3. An optical signal transmitted through the optical fiber 091 is reflected on the demultiplexer 08, and the receiver optical sub-assembly 07 is exactly on a reflection optical path, to receive the optical signal.

For a separate TOSA and ROSA, due to material features of devices such as a transmitter (laser diode) and a receiver (photodiode), the TOSA and ROSA are sensitive to water vapor and oxygen in an environment. If the TOSA and ROSA are exposed to corresponding gases, performance of the devices may deteriorate over time, causing a fault. Therefore, a form of a TO can is usually used for packaging, and a hermetic technique is used in a production process. A method includes welding a cap to a header in a pure nitrogen environment.

Figure 4:
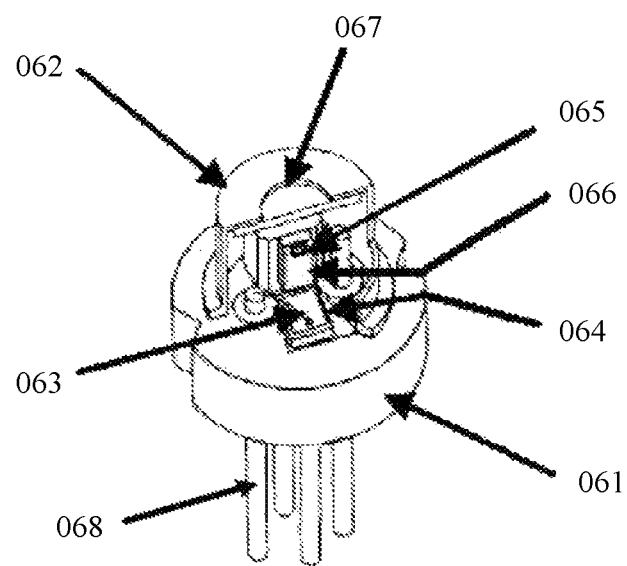
FIG. 4 is a schematic diagram of a typical package structure of a transmitter optical sub-assembly.

For example, FIG. 4 is a diagram of a package structure of the TOSA. The TOSA mainly includes a metal header 061 having pins, a cap 062, a photodiode (PD) 063 disposed on the header 061, a submount 064, a laser diode (LD) 065, a heat sink 066, and a window 067. The pins 068 on the header 061 are connected to signal electrodes on the laser diode 065 through gold wires, such that an external electrical signal can be transmitted to the laser diode 065 for electronic-to-optical conversion.

Figure 5:
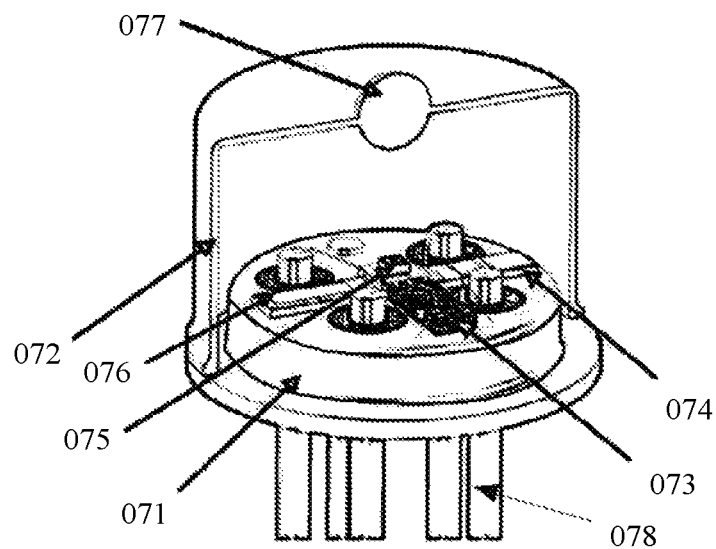
FIG. 5 is a schematic diagram of a typical package structure of a receiver optical sub-assembly.

FIG. 5 is diagram of a package structure of the ROSA. The ROSA mainly includes a metal header 071 having pins, a cap 072, a trans-impedance amplifier (TIA) 073, a submount 074, a photodiode 075, a capacitor 076, and a spherical lens 077. A signal obtained after optical-to-electrical conversion by the photodiode 075 may be output through the pins 078 on the header 071.

A structure with a WDM module externally disposed leads to high construction costs, large equipment room space occupied, complex construction and cabling, and difficult management and maintenance. Therefore, the WDM module may be disposed in the optical module.

The following uses a GPON as an example for description. The same holds true for an EPON scenario.

An optical module that can simultaneously support any two different transmission rates may be referred to as a combo optical module. For example, the combo optical module may simultaneously support rates of any two of the GPON, an XGPON, a 25G GPON, and a 50G GPON, or simultaneously support rates of any two of the EPON, a 10GEPON, a 25G EPON, and a 50G EPON. It may be understood that the combo optical module may also be referred to as an optical module.

With respect to a used wavelength of an optical signal, an optical line terminal in the GPON uses a 1490-nanometer wavelength for sending and a 1310-nanometer wavelength for receiving. An optical line terminal in the XGPON uses a 1577-nanometer for sending and a 1270-nanometer for receiving. In the combo bi-directional optical sub-assembly, receiving and sending of the optical signals of the two wavelengths need to coexist using a particular structure design. This requires a series of WDM modules (multiplexer or demultiplexer) to combine and separate the optical signals of the two wavelengths. In addition, a specific narrow-band filter needs to be disposed before the receiver, to further filter out other possible stray light. For example, a 0-degree filter that passes only a 1270-nm band should be disposed before a 1270-nm receiver, and a 0-degree filter that passes only a 1310-nm band should be disposed before a 1310-nm receiver.

Figure 6:
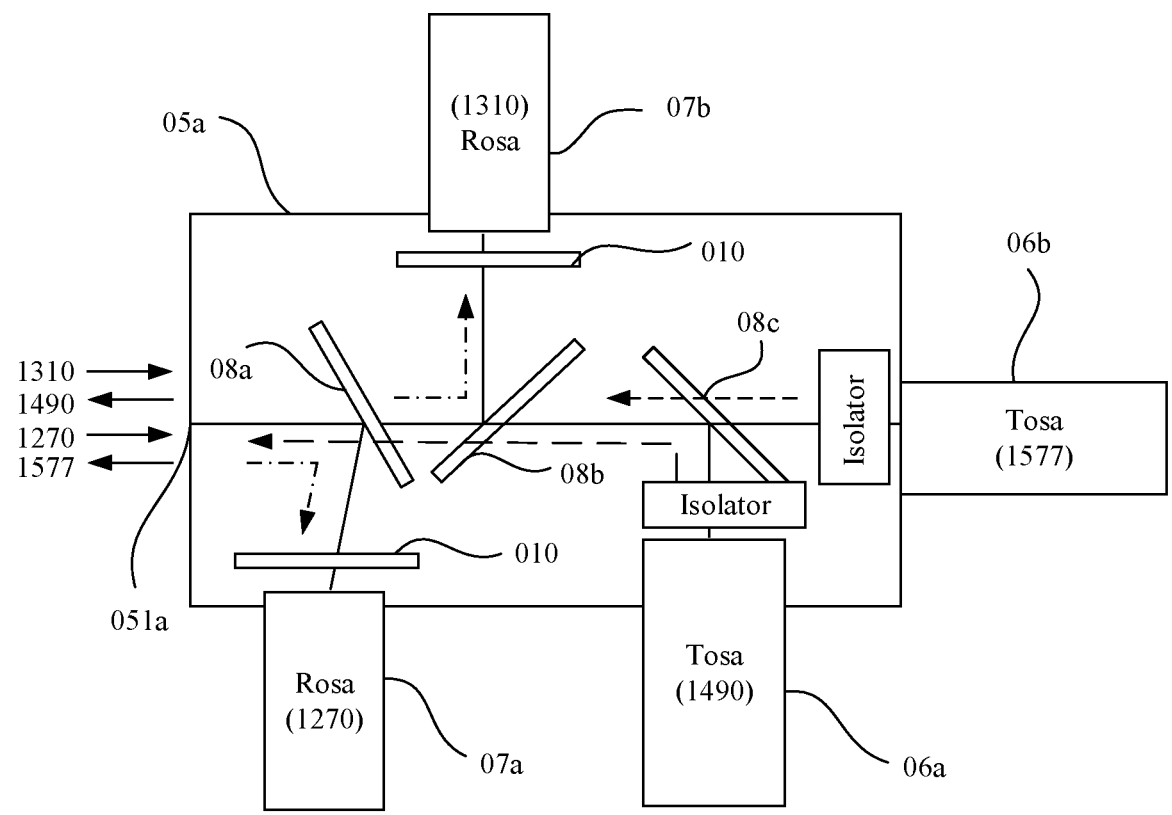
FIG. 6 is a schematic structural diagram of a combo bi-directional optical sub-assembly.

FIG. 6 is a schematic structural diagram of a combo bi-directional optical sub-assembly. The combo bi-directional optical sub-assembly mainly includes a housing 05*a*. The housing 05*a* is provided with a first transmitter optical sub-assembly 06*a*, a second transmitter optical sub-assembly 06*b*, a first receiver optical sub-assembly 07*a*, and a second receiver optical sub-assembly 07*b*. A first demultiplexer 08*a*, a second demultiplexer 08*b*, and a multiplexer 08*c* are disposed in the housing 05*a*. A left end of the housing 05*a* is an optical fiber access port 051*a*. After entering the housing 05*a* through the optical fiber access port 051*a*, a 1270-nm optical signal is reflected by the first demultiplexer 08*a* and enters the first receiver optical sub-assembly 07*a*. After entering the housing 05*a* through the optical fiber access port 051*a*, a 1310-nm optical signal is transmitted through the first demultiplexer 08*a* and is reflected by the second demultiplexer 08*b* and enters the second receiver optical sub-assembly 07*b*. After being reflected by the multiplexer 08*c*, light sent by the first transmitter optical sub-assembly 06*a* passes left successively through the second demultiplexer 08*b* and the first demultiplexer 08a, and is emitted from the optical fiber access port 051a. Light sent by the second transmitter optical sub-assembly 06b successively passes through the optical multiplexer 08c, the second demultiplexer 08b, and the first demultiplexer 08a, and is emitted from the optical fiber access interface 051a. The isolator in FIG. 6 has a function of reducing impact of reflected light on performance of a laser in a network. A 0-degree filter 010 in FIG. 6 is configured to filter out other possible stray light.

The structure in FIG. 6 uses two completely independent bi-directional sub-assemblies. A tailored housing is designed and produced, and a series of fastening structures are provided in the housing to dispose a plurality of WDM modules, a 0-degree filter, and an isolator. In addition, two TOSAs and two ROSAs are disposed around the square housing. The entire structure is used to implement two transceiver functions in a GPON and an XGPON. However, the applicants find that, in this solution, a tailored housing with a complex structure is required. This imposes a high requirement on manufacturing precision, and in particular, higher requirement is imposed on manufacturing precision of a structure in which various wave filters and bi-directional sub-assemblies are disposed. In addition, coupling may become difficult due to a manufacturing deviation in a long-optical-path condition. Generally, in a device manufacturing process, coupling of the TOSA may be in an active manner (to be more specific, powering on the TOSA, slightly adjusting a location of the TOSA, and monitoring output optical power at an output end), and coupling of the ROSA is usually in a passive manner (directly disposing and fastening the ROSA with black adhesive without location adjustment). Complexity of this structure causes great difficulty to the coupling and cannot effectively ensure a yield rate. In addition, a location at which the first demultiplexer is disposed causes non-perpendicular incidence of a receive optical fiber of the first receiver optical sub-assembly. Consequently, receiving efficiency cannot be optimized.

In addition, because a plurality of transistor-outline can structures are used, an optical path is relatively long. As a result, an overall length of a bi-directional sub-assembly manufactured according to this solution cannot be reduced. Consequently, in a subsequent optical module manufacturing process, a total length of a control circuit and optical sub-assemblies cannot be controlled, and a housing of an optical module needs to be lengthened. However, a size of an optical module needs to be in accordance with a specific standard. A standard for a GPON is Small Form-Factor Pluggable (SFP), and a standard for an XGPON is SFP+. Sizes of optical modules according to the two standards are the same. If the overall length of the optical module is uncontrollable, a size of a final module cannot be controlled and therefore cannot meet the standard requirements.

Figure 7:
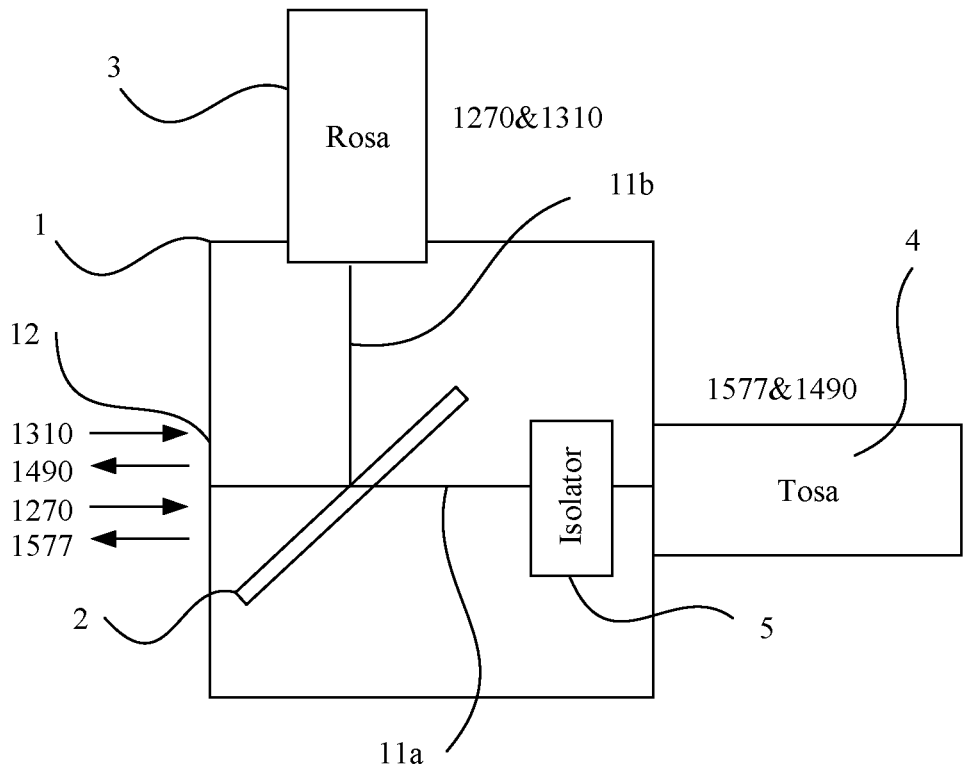
FIG. 7 is a schematic diagram of an overall architecture of a combo bi-directional optical sub-assembly according to an embodiment of this application.
Figure 8:
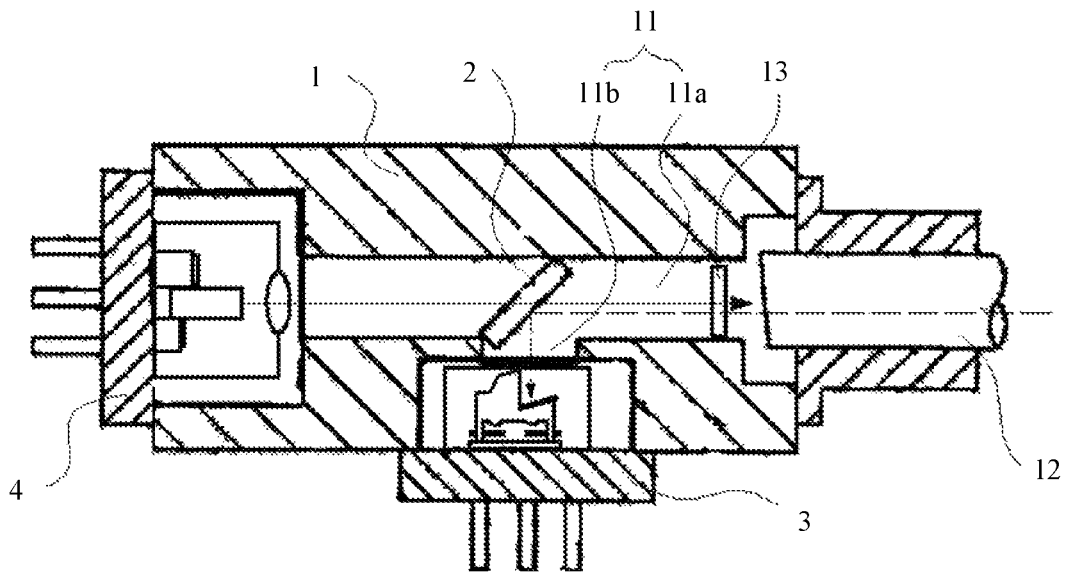
FIG. 8 is a schematic diagram of a package structure of a combo bi-directional optical sub-assembly according to an embodiment of this application.

To resolve the foregoing problems, as shown in FIG. 7 and FIG. 8, an embodiment of this application provides a combo bi-directional optical sub-assembly, including: a housing 1, where an optical transmission channel 11 is disposed in the housing 1, a second demultiplexer 2 is disposed on the optical transmission channel 11, and an optical receive port, an optical transmit port, and an optical fiber connection port 12 that are in communication with the optical transmission channel 11 are disposed in the housing; a receiver optical sub-assembly 3, where the receiver optical sub-assembly 3 is packaged at the optical receive port; and a transmitter optical sub-assembly 4, where the transmitter optical sub-assembly 4 is packaged at the optical transmit port.

The second demultiplexer 2 can reflect, to the optical receive port, an optical signal of a first wavelength and an optical signal of a second wavelength that enter from the optical fiber connection port 12, and can transmit, to the optical fiber connection port 12, an optical signal of a third wavelength and an optical signal of a fourth wavelength that are emitted by the receiver optical sub-assembly 4.

A light sending path is shown by a solid line arrow in FIG. 8. Light emitted by the transmitter optical sub-assembly 4 is transmitted through the second demultiplexer 2 in a straight line, and then enters the optical fiber connection port 12 for transmission. An optical receiving path is shown by a dashed line arrow in FIG. 8. An optical signal transmitted through the optical fiber connection port 12 is reflected on the second demultiplexer 2, and the receiver optical sub-assembly 3 is exactly on a reflection optical path, to receive the optical signal. For the receiver optical sub-assembly 3, two receiver sub-assemblies are packaged into a same transistor-outline can, and a demultiplexer is disposed inside the transistor-outline can, to implement demultiplexing and receiving of upstream optical signals. Similarly, for the transmitter optical sub-assembly 4, two transmitter sub-assemblies are packaged into a same transistor-outline can, and a multiplexer is disposed inside the transistor-outline can, to implement multiplexing and sending of downstream optical signals. Therefore, as shown in FIG. 8, the structure is applicable to an existing BOSA package structure, and a tailored housing is not required. This reduces manufacturing costs, simplifies a packaging process, and meets an existing standard requirement for a size of an optical module. In addition, the structure is simple, an optical path is short, and coupling difficulty is low.

A package structure may be shown in FIG. 8. The optical transmission channel 11 includes a first optical channel 11a connecting the optical transmit port and the optical fiber connection port 12 and a second optical channel 11b connecting the optical receive port and the first optical channel 11a. The second demultiplexer 2 is disposed at a junction of the first optical channel 11a and the second optical channel 11b. The optical channel has a simple structure and is in line with an existing BOSA housing manufacturing process. This improves manufacturing efficiency.

To reduce impact of reflected light on performance of the transmitter optical sub-assembly 4 in a network, as shown in FIG. 7, an isolator 5 may be disposed in the optical transmission channel 11 between the transmitter optical sub-assembly 4 and the second demultiplexer 2.

To collimate the optical path, a collimation lens 13 may be inside disposed in the optical fiber connection port 12.

Implementations of the receiver optical sub-assembly 3 and the transmitter optical sub-assembly 4 are described below using examples.

Figure 9:
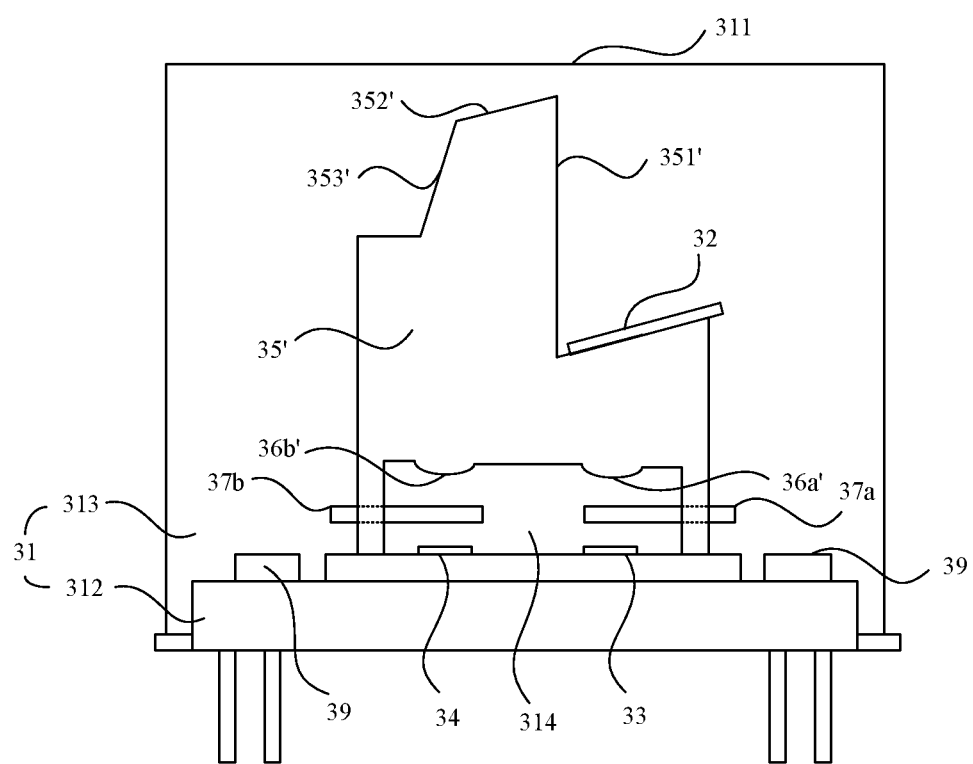
FIG. 9 is a schematic diagram of a package structure of a receiver optical sub-assembly according to an embodiment of this application.
Figure 10:
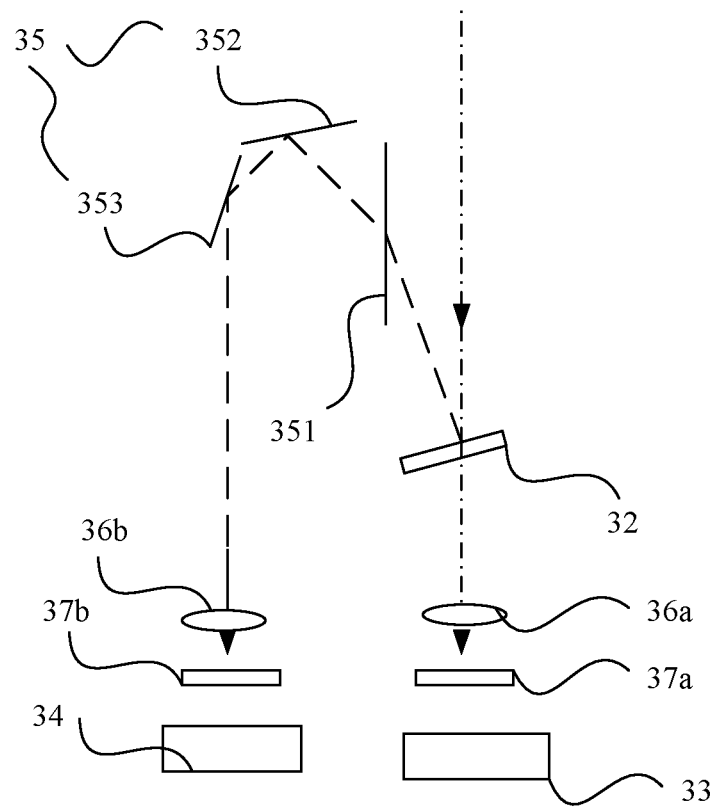
FIG. 10 is a schematic diagram of an optical path of a receiver optical sub-assembly according to an embodiment of this application.

An implementation of the receiver optical sub-assembly 3 is shown in FIG. 9 and FIG. 10. The receiver optical sub-assembly 3 includes a first transistor-outline can 31, where a light incident hole 311 is disposed on the first transistor-outline can 31, and where a first demultiplexer 32, a first optical receiver 33, a second optical receiver 34, and an optical lens combination 35 are packaged in the first transistor-outline can 31. The first optical receiver 33 can receive an optical signal of a first wavelength, and the second optical receiver 34 can receive an optical signal of a second wavelength. Light enters the first demultiplexer 32 through the light incident hole 311, and the first demultiplexer 32 is configured to transmit the optical signal of the first wavelength and reflect the optical signal of the second wavelength. The first optical receiver 33 is disposed on a transmission optical path of the first demultiplexer 32, and the optical lens combination 35 is disposed on a reflection optical path of the first demultiplexer 32. The optical lens combination 35 is configured to guide, to the second optical receiver 34, the optical signal of the second wavelength that is reflected by the first demultiplexer 32.

According to the receiver optical sub-assembly 3 provided in this embodiment of this application, the first optical receiver 33 in the receiver optical sub-assembly 3 can receive the optical signal of the first wavelength, the second optical receiver 34 can receive the optical signal of the second wavelength, and the first demultiplexer 32 can transmit the optical signal of the first wavelength and reflect the optical signal of the second wavelength. In this way, upstream optical signals of different wavelengths are separated, such that the upstream optical signals can be demultiplexed and received. In addition, the first demultiplexer 32 is disposed in the receiver optical sub-assembly 3. That is, the built-in demultiplexer 32 is implemented such that excessive demultiplexers do not need to be disposed in the housing of the combo bi-directional optical sub-assembly, and a tailored housing structure is not required to fasten the demultiplexers. This reduces housing manufacturing costs of the combo bi-directional optical sub-assembly. In addition, a transistor-outline can is used for packaging of the receiver optical sub-assembly 3, and therefore is compatible with an existing TO packaging process. This avoids a complex tailored housing, and reduces manufacturing costs.

The optical lens combination includes a refractor and at least one reflector. The refractor is disposed on the reflection optical path of the first demultiplexer 32, and the optical signal of the second wavelength that is refracted by the refractor enters the second optical receiver after being successively reflected by the reflectors. If there is only one reflector, the reflector is disposed on a refraction optical path of the refractor, and an angle of the reflector is adjusted to enable the reflected optical signal of the second wavelength to enter the second optical receiver. If there are a plurality of reflectors, one of the reflectors is disposed on the refraction optical path of the refractor, and the remaining reflectors are sequentially disposed, with a reflector being located on a reflection optical path of a previous reflector, and a reflection optical path of the last reflector coinciding with a receiving optical path of the second optical receiver. When an included angle between the reflection optical path of the first demultiplexer 32 and an incident optical path of the first demultiplexer 32 is relatively small, the refractor may be disposed along an approximately vertical direction that is close to the incident optical path of the first demultiplexer 32. In this way, after entering the refractor, an optical signal reflected by the first demultiplexer 32 deflects in a direction away from the incident optical path of the first demultiplexer 32, such that there is sufficient space to dispose the reflector.

There may be a plurality of relative locations when the first optical receiver 33 and the second optical receiver 34 are disposed, for example, disposed in parallel and side by side, disposed perpendicular to each other, or disposed at a specific angle. As shown in FIG. 5, in the existing TO packaging process, the optical receiver (namely, a photodiode 075) is disposed on the header 071. To enable the receiver optical sub-assembly 3 in this application to adapt to the existing TO packaging process, as shown in FIG. 10, the first optical receiver 33 and the second optical receiver 34 may be disposed side by side. In this case, to enable the two optical receivers to receive corresponding optical signals, as shown in FIG. 10, the optical lens combination 35 may include a refractor 351, a first reflector 352, and a second reflector 353. The refractor 351 is disposed on the reflection optical path of the first demultiplexer 32, the first reflector 352 is disposed on a refraction optical path of the refractor 351, and the second reflector 353 is disposed on a reflection optical path of the first reflector 352. A reflection optical path of the second reflector 353 is parallel to the transmission optical path of the first demultiplexer 32 and coincides with the receiving optical path of the second optical receiver 34. As shown by arrows in FIG. 10, after optical signals enter from an incident hole, the optical signal of the first wavelength is directly transmitted through the first demultiplexer 32 and enters the first optical receiver 33, and the optical signal of the second wavelength is reflected by the first demultiplexer 32, and enters the second optical receiver 34 along the receiving optical path of the second optical receiver 34 after being refracted by the refractor 351, and reflected by the first reflector 352 and the second reflector 353 successively. Therefore, the first optical receiver 33 and the second optical receiver 34 can be disposed on a same side. This is more in line with the existing TO package structure, and has a more compact structure. In addition, it is ensured that receiving optical paths of the two optical receivers can be vertically coupled, and coupling efficiency is improved. The first reflector 352 and the second reflector 353 are disposed and cooperate with the refractor 351, such that the optical signal of the second wavelength can be adjusted to be vertically incident to the second optical receiver 34, to improve coupling efficiency of the second optical receiver 34.

To implement light concentration and filtering, as shown in FIG. 10, a first condenser lens 36a and a first filter 37a are sequentially disposed on the receiving optical path of the first optical receiver 33 in a light incident direction of the first optical receiver 33, and a second condenser lens 36b and a second filter 37b are sequentially disposed on the receiving optical path of the second optical receiver 34 in a light incident direction of the second optical receiver 34. Therefore, the first condenser lens 36a and the second condenser lens 36b may implement light concentration, such that a signal is strengthened. The first filter 37a and the second filter 37b may implement filtering, to prevent impact of other stray light on an optical signal.

It should be noted that a filter may be further disposed at the light incident hole 311. In this case, the first filter 37a and the second filter 37b do not need to be disposed.

Figure 11:
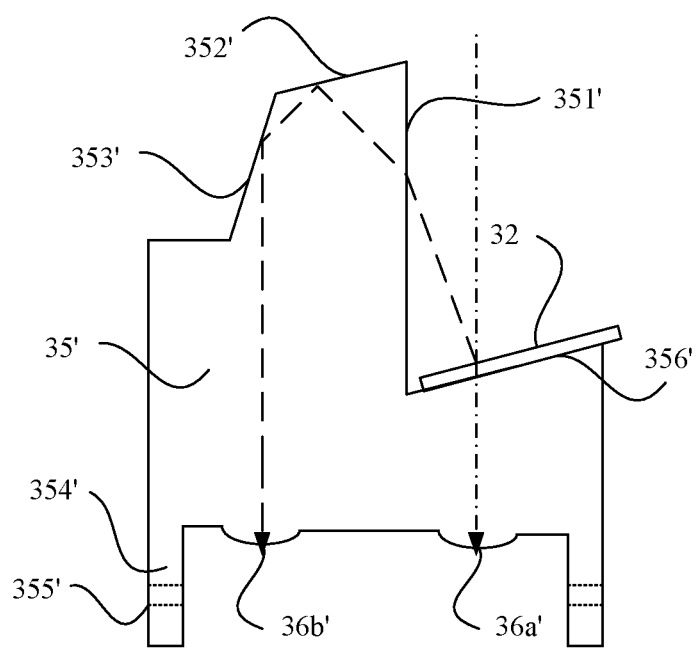
FIG. 11 is a schematic structural diagram of an optical prism in a receiver optical sub-assembly according to an embodiment of this application.

The optical lens combination 35 may include a plurality of optical lens 35, or may be designed as an entire structure. As shown in FIG. 9 and FIG. 11, the optical lens combination 35 is an integrated optical prism 35'. A refraction surface 351', a first reflection surface 352', and a second reflection surface 353' are disposed on the optical prism 35'. The refraction surface 351' is disposed on the reflection optical path of the first demultiplexer 32, the first reflection surface 352' is disposed on a refraction optical path of the refraction surface 351', the second reflection surface 353' is disposed on a reflection optical path of the first reflection surface 352', and a reflection optical path of the second reflection surface 353' coincides with the receiving optical path of the second optical receiver 34. As shown by arrows in FIG. 11, the optical signal of the first wavelength is directly transmitted through the first demultiplexer 32 and the optical prism 35', and enters the first optical receiver 33. The optical signal of the second wavelength is reflected by the first demultiplexer 32, refracted by the refraction surface 351' of the optical prism 35', and then transferred inside the optical prism 35'. The optical signal of the second wavelength is transferred to the first reflection surface 352' in the optical prism 35' and is reflected for the first time, and then is transferred to the second reflection surface 353' in the optical prism 35' and is reflected for the second time. The light reflected for the second time is emitted from the bottom surface of the optical prism 35' along the receiving optical path of the second optical receiver 34, and enters the second optical receiver 34. The optical lens combination 35 is integrated on the optical prism 35', such that a structure is compact, and installation and manufacturing are easier.

In addition, the first condenser lens 36*a* and the second condenser lens 36*b* may be further integrated on the optical prism 35'. For example, as shown in FIG. 9 and FIG. 11, the first condenser lens 36*a* is a first light concentrating surface 36*a*' on the bottom surface of the optical prism 35', and the second condenser lens 36*b* is a second light concentrating surface 36*b*' on the bottom surface of the optical prism 35'. The first light concentrating surface 36*a*' corresponds to the first optical receiver 33, and the second light concentrating surface 36*b*' corresponds to the second optical receiver 34. Therefore, the overall structure is more compact.

As shown in FIG. 9, the first filter 37*a* and the second filter 37*b* may be further inserted into the optical prism 35', the first filter 37*a* is located between the first light concentrating surface 36*a*' and the first optical receiver 33, and the second filter 37*b* is located between the second light concentrating surface 36*b*' and the second optical receiver 34. Therefore, the filter can be easily installed. As shown in FIG. 11, the optical prism 35' may include two support legs 354', and there are slots 355' on the support legs 354'. The first filter 37*a* and the second filter 37*b* are inserted into the respective slots 355' on the two support legs 354'.

The optical prism 35' can implement all functional elements in the optical path through a mold structure, for example, may be formed at a time in a high-polymer die-casting manner.

The first filter 37*a* and the second filter 37*b* may be 0-degree filters. In addition, the first reflector 352 and the second reflector 353 may be total reflectors, thereby preventing optical signal strength from being attenuated during reflection. The first optical receiver 33 and the second optical receiver 34 may be photodiodes, such that the optical signal of the first wavelength and the optical signal of the second wavelength may be converted into electrical signals for output.

The first demultiplexer 32 may be further fastened to the prism body. As shown in FIG. 11, an installation surface 356' is formed on the prism body, and the first demultiplexer 32 is fastened to the installation surface 356'. By adjusting an included angle between the installation surface 356' and the refraction surface 351', it can be ensured that the refraction surface 351' is located on the reflection optical path of the first demultiplexer 32. Therefore, the first demultiplexer 32 may be fastened to the prism body, to improve utilization of installation space.

A structure of the first transistor-outline can 31 may be shown in FIG. 9, including a first header 312 and a first cap 313 disposed on the first header 312. The optical prism 35' is fastened on the first header 312, installation space 314 exists between the optical prism 35' and the first header 312, and the first optical receiver 33 and the second optical receiver 34 are disposed in the installation space 314 and are securely connected to the first header 312. Therefore, installation space of the first optical receiver 33 and the second optical receiver 34 may be saved, and the first optical receiver 33 and the second optical receiver 34 may be effectively protected using the optical prism 35'.

Because light received by the optical receiver is relatively weak, a generated electrical signal is quite weak and needs to be amplified before being processed. In view of this, as shown in FIG. 9, the electrical signal generated by the optical receiver may be output to an amplifier 39 for amplification, that is, the optical receiver is connected to the amplifier 39, and the amplifier 39 is connected to the pins. Therefore, electrical signals generated after optical-to-electrical conversion by the first optical receiver 33 and the second optical receiver 34 may be amplified, such that the electrical signals are strengthened for output.

During packaging of the first optical receiver 33 and the second optical receiver 34 on the first header 312, the following steps are performed: A substrate is first surface-mounted on the first header 312, and a specific metal circuit is constructed on the substrate. Then the first optical receiver 33 and the second optical receiver 34 are surface-mounted on the substrate, and gold wire bonding is performed on the first optical receiver 33 and the second optical receiver 34 with the metal circuit. Gold wire bonding is also performed on the metal circuit and a peripheral TIA. Two 0-degree filters are inserted into the optical prism 35', and the optical prism 35' is surface-mounted on the substrate. In this case, coupling efficiency of the two optical receivers is ensured with mounting precision. The first demultiplexer 32 is surface-mounted on the optical prism 35', and finally the first cap 313 is used to cover the entire device to implement hermetic packaging. The pins and the first header 312 may be separated using glass cement, and the pins and the first header 312 are electrically isolated from each other. Generally, the entire first header 312 is configured to be used as a ground plane, and is connected to an external ground using a special pin connected to the first header 312. The foregoing electrical connections may be implemented through gold wire welding.

In another implementation of the receiver optical sub-assembly 3, the optical lens combination may not include a refractor, but includes only at least one reflector. The optical signal of the second wavelength that is reflected by the first demultiplexer enters the second optical receiver after being successively reflected by the reflectors. If there is only one reflector, the reflector is disposed on the reflection optical path of the first demultiplexer, and an angle of the reflector is adjusted to enable the reflected optical signal of the second wavelength to enter the second optical receiver. If there are a plurality of reflectors, one of the reflectors is disposed on the reflection optical path of the first demultiplexer, and the remaining reflectors are sequentially disposed, with a reflector being located on a reflection optical path of a previous reflector, and a reflection optical path of the last reflector coinciding with the receiving optical path of the second optical receiver.

Figure 12:
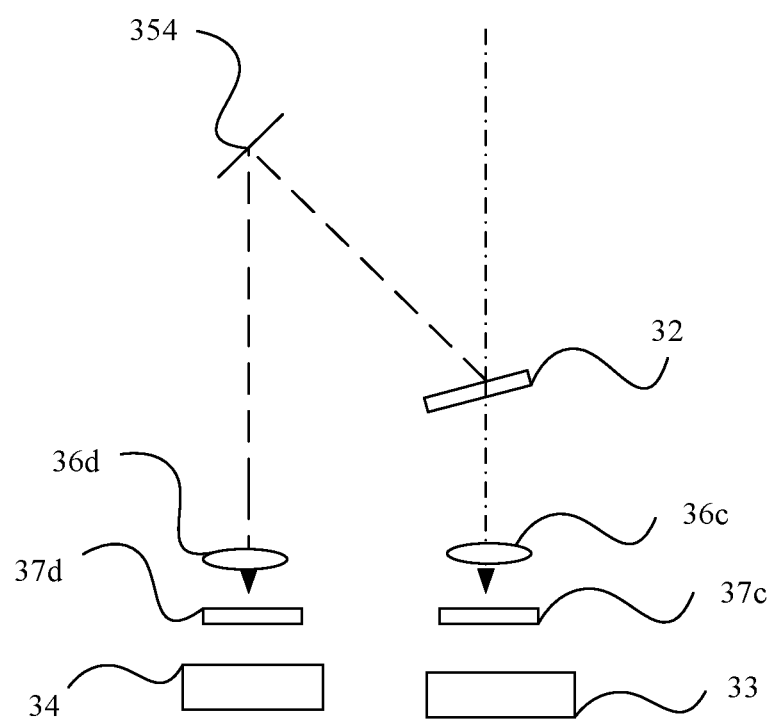
FIG. 12 is a schematic diagram of an optical path of a receiver optical sub-assembly according to another embodiment of this application.

FIG. 12 shows an implementation in which the receiver optical sub-assembly 3 does not include a refractor. The first optical receiver 33 and the second optical receiver 34 are disposed side by side, and receiving optical paths thereof are parallel to each other. The optical lens combination 35 includes a third reflector 354, where the third reflector 354 is disposed on the reflection optical path of the first demultiplexer 32, and where a reflection optical path of the third reflector 354 is parallel to the transmission optical path of the first demultiplexer 32 and coincides with the receiving optical path of the second optical receiver 34. After being split by the first demultiplexer 32, a part of received light is directly transmitted and enters the first optical receiver 33. The other part of the received light is incident to the third reflector 354, and is reflected by the third reflector 354 and enters the second optical receiver 34 along the receiving optical path of the second optical receiver 34. In this implementation, the first optical receiver 33 and the second optical receiver 34 can be disposed on a same side, such that the first optical receiver 33 and the second optical receiver 34 are compatible with the existing TO package structure, an optical path may be shorter, and a smaller signal loss is caused.

Similarly, to achieve light concentration and filtering, a third condenser lens 36c and a third filter 37c are sequentially disposed on the receiving optical path of the first optical receiver 33 in the light incident direction of the first optical receiver 33, and a fourth condenser lens 36d and a fourth filter 37d are sequentially disposed on the receiving optical path of the second optical receiver 34 in the light incident direction of the second optical receiver 34. In this way, light concentration and filtering can be implemented, to prevent impact of other stray light on an optical signal. Therefore, the third condenser lens 36c and the fourth condenser lens 36d may implement light concentration, such that a signal is strengthened. The third filter 37c and the fourth filter 37d may implement filtering, to prevent impact of other stray light on an optical signal.

Figure 13:
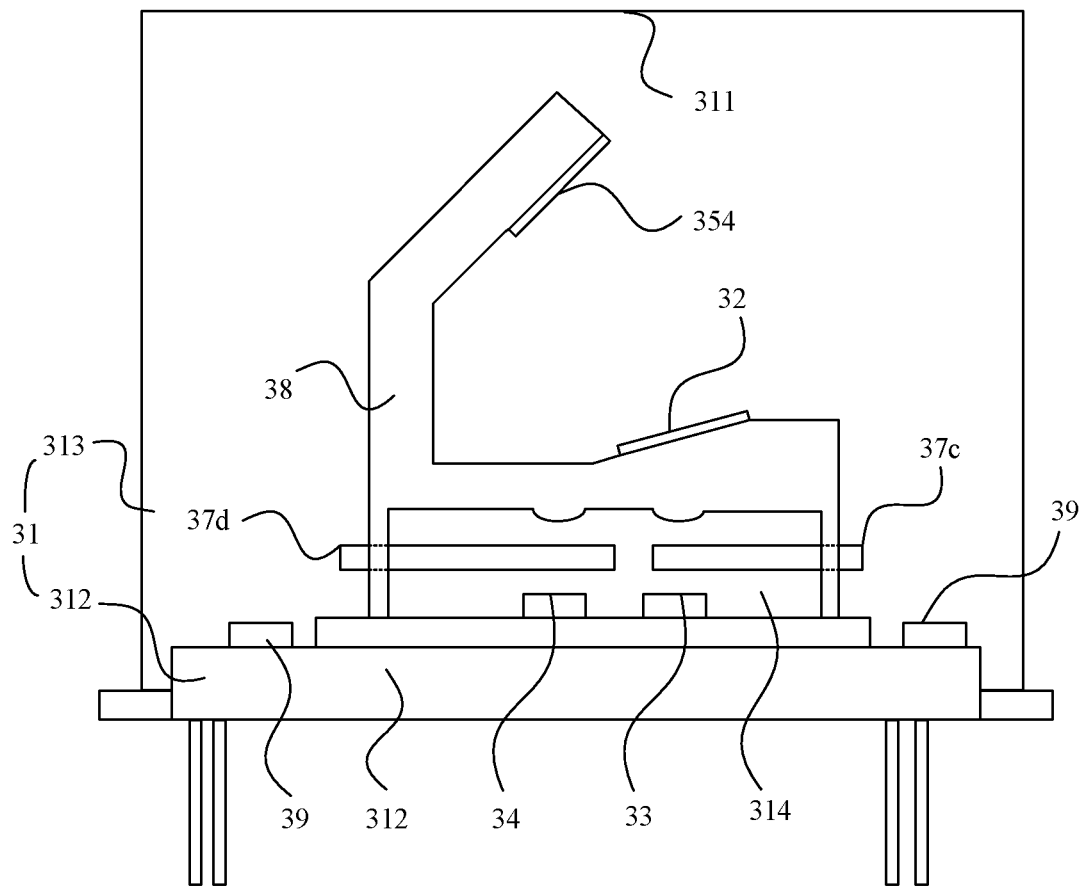
FIG. 13 is a schematic diagram of a package structure of a receiver optical sub-assembly according to another embodiment of this application.
Figure 14:
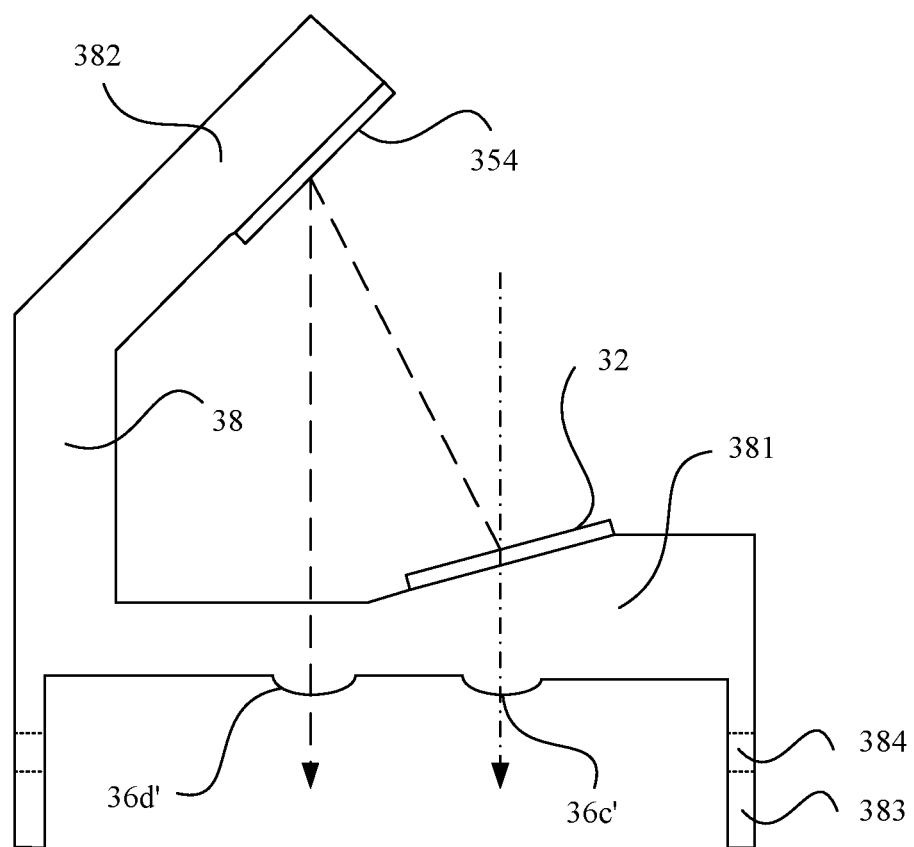
FIG. 14 is a schematic structural diagram of a transparent support in a receiver optical sub-assembly according to another embodiment of this application.

To facilitate fastening of the first demultiplexer 32 and the third reflector 354, as shown in FIG. 13 and FIG. 14, a transparent support 38 may be disposed. The transparent support 38 includes a bottom plate 381 and a roof plate 382. The first demultiplexer 32 is fastened on the bottom plate 381, the third reflector 354 is fastened on the roof plate 382 and is located on the reflection optical path of the first demultiplexer 32, and the first optical receiver 33 and the second optical receiver 34 are disposed on the bottom surface of the bottom plate 381. Therefore, the first demultiplexer 32 and the third reflector 354 may be fastened to the transparent support 38, such that the structure is compact. The bottom plate 381 and the roof plate 382 may be integrally formed using a transparent material, or may be made independently. This is not limited herein.

Figure 15:
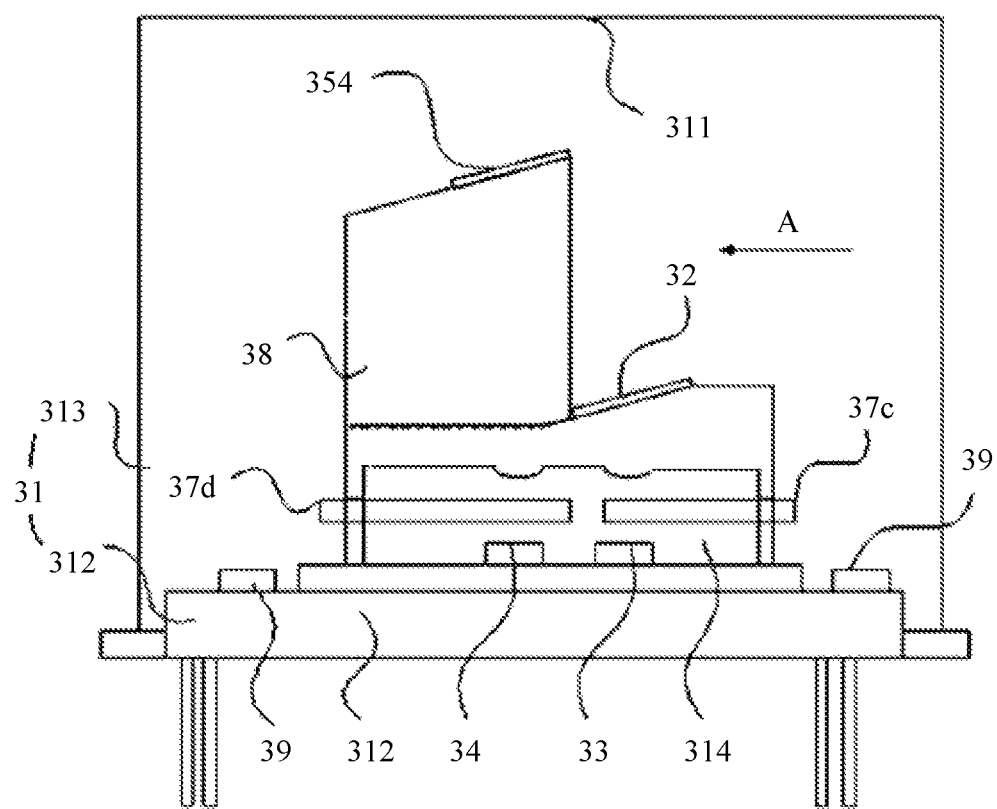
FIG. 15 is a schematic structural diagram of a receiver optical sub-assembly when another structure is used for a transparent support.
Figure 16:
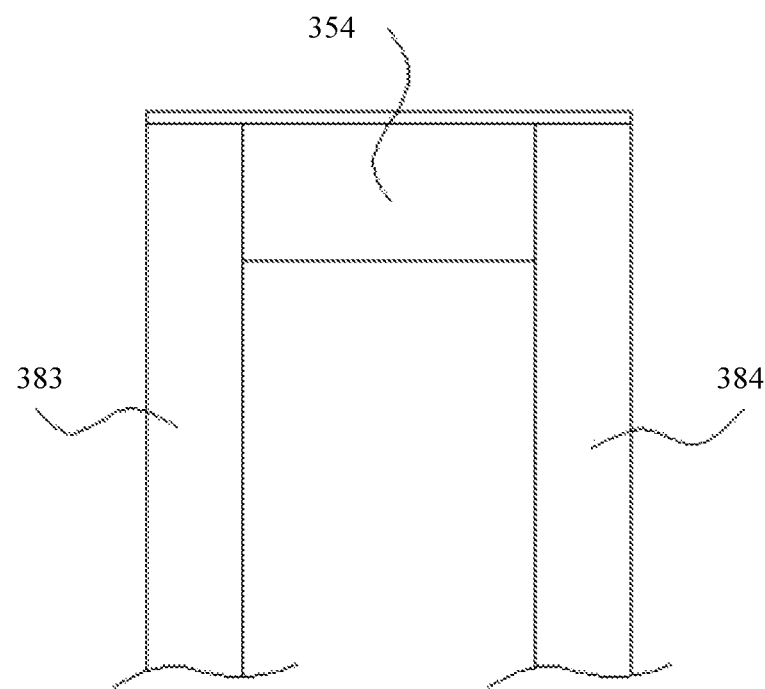
FIG. 16 is a partial schematic diagram of the structure in FIG. 15 from a direction A.

In another possible implementation, as shown in FIG. 15 and FIG. 16, the transparent support 38 further includes a first support plate 383 and a second support plate 384. The first support plate 383 and the second support plate 384 are disposed at an interval, and the third reflector is disposed over the first support plate 382 and the second support plate 384. After being split by the first demultiplexer 32, a part of the received light is directly transmitted and enters the first optical receiver 33. The other part of the received light is reflected by the first demultiplexer 32 and is incident to the third reflector 354 through a gap between the first support plate 383 and the second support plate 384, and then is reflected by the third reflector 354 and enters the second optical receiver 34 along the receiving optical path of the second optical receiver 34. In this embodiment, the first support plate 383 and the second support plate 384 may be made of a transparent material, or may be made of an opaque material. This is not limited herein.

In addition, the third condenser lens 36c and the fourth condenser lens 36d may be further integrated on the transparent support 38. As shown in FIG. 13 and FIG. 14, the third condenser lens 36c is a third light concentrating surface 36c' on the bottom surface of the bottom plate 381, and the fourth condenser lens 36d is a fourth light concentrating surface 36d' on the bottom surface of the bottom plate 381. The third light concentrating surface 36c' corresponds to the first optical receiver 33, and the fourth light concentrating surface 36d' corresponds to the second optical receiver 34. Therefore, the overall structure is more compact.

As shown in FIG. 13, the third filter 37c and the fourth filter 37d may be further inserted into the transparent support 38. The third filter 37c is located between the third light concentrating surface 36c' and the first optical receiver 33, and the fourth filter 37d is located between the fourth light concentrating surface 36d' and the second optical receiver 34. Therefore, the filter can be easily installed. As shown in FIG. 14, the transparent support 38 may include a support leg 383, and there is a support slot 384 on the support leg 383. The third filter 37c and the fourth filter 37d are inserted into the two respective support slots 384.

The structure of the first transistor-outline can 31 may be shown in FIG. 13. The first transistor-outline can 31 includes the first header 312 and the first cap 313 disposed on the first header 312, the transparent support 38 is fastened on the first header 312, installation space exists between the transparent support 38 and the first header 312, and the first optical receiver 33 and the second optical receiver 34 are disposed in the installation space and are securely connected to the first header 312. In this way, installation space can be saved.

Using transmit and receive wavelengths of a GPON and an XGPON as an example, the optical signal of the first wavelength may be an optical signal of a 1310-nm wavelength, and the optical signal of the second wavelength may be an optical signal of a 1270-nm wavelength. Alternatively, the optical signal of the first wavelength may be an optical signal of a 1270-nm wavelength, and the optical signal of the second wavelength may be an optical signal of a 1310-nm wavelength. In this way, optical signals of the GPON and the XGPON can be received.

Figure 17:
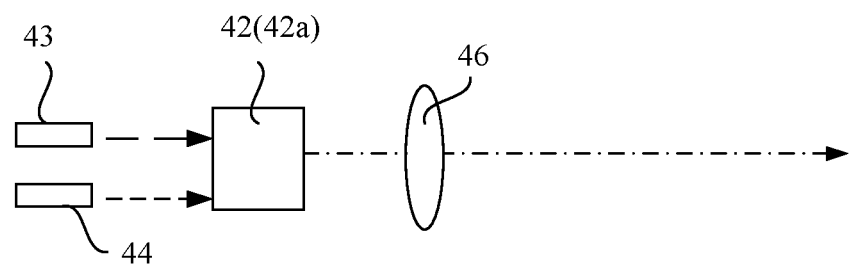
FIG. 17 is a schematic diagram of an optical path of a transmitter optical sub-assembly according to an embodiment of this application.
Figure 18:
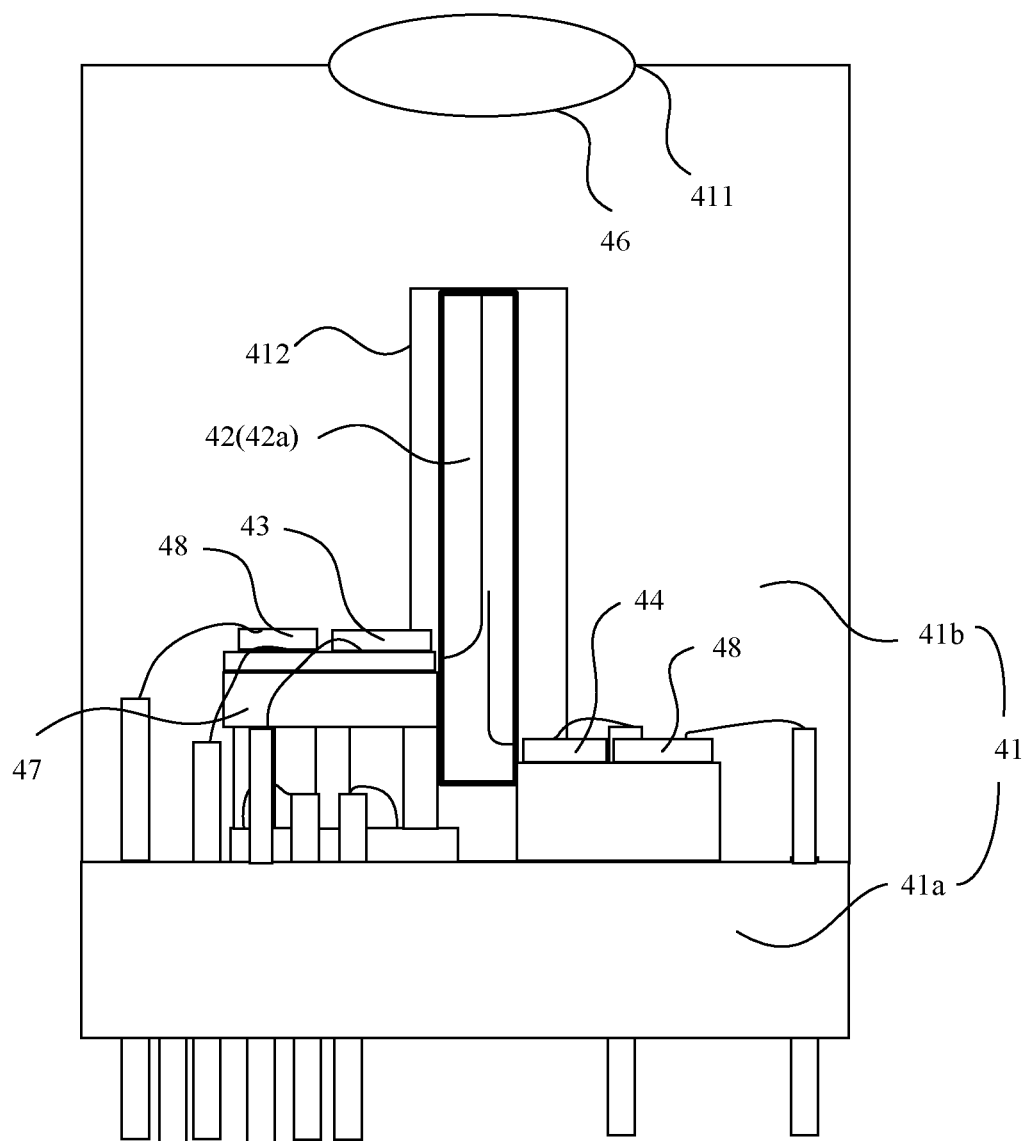
FIG. 18 is a schematic diagram of a package structure of a transmitter optical sub-assembly according to an embodiment of this application.

An implementation of the transmitter optical sub-assembly 4 may be shown in FIG. 17 and FIG. 18. The transmitter optical sub-assembly 4 includes a second transistor-outline can 41, where an out-light hole 411 is disposed on the second transistor-outline can 41. A multiplexer 42, a first optical transmitter 43, and a second optical transmitter 44 are packaged in the second transistor-outline can 41. The first optical transmitter 43 can send an optical signal of a third wavelength, and the second optical transmitter 44 can send an optical signal of a fourth wavelength. The multiplexer 42 is located on sending optical paths of the first optical transmitter 43 and the second optical transmitter 44. The multiplexer 42 can combine the optical signal of the third wavelength and the optical signal of the fourth wavelength, and send a combined optical signal to the out-light hole 411.

According to the transmitter optical sub-assembly 4 provided in the embodiments of this application, the first optical transmitter 43 can send the optical signal of the third wavelength, the second optical transmitter 44 can send the optical signal of the fourth wavelength, and the multiplexer 42 can combine the optical signal of the third wavelength and the optical signal of the fourth wavelength for sending. In this way, downstream optical signals can be multiplexed and sent. In addition, the multiplexer 42 is disposed in the transmitter optical sub-assembly 4, that is, the built-in multiplexer 42 is implemented, such that excessive multiplexers 42 do not need to be disposed in the housing of the combo bi-directional optical sub-assembly, and a tailored housing structure is not required to fasten the optical multiplexer 42. This reduces housing manufacturing costs of the combo bi-directional optical sub-assembly. In addition, a transistor-outline can is used for packaging of the transmitter optical sub-assembly 4, and therefore is compatible with the existing TO packaging process. This avoids a complex tailored housing, and reduces manufacturing costs.

The multiplexer 42 may be a waveguide multiplexer, a slide multiplexer, or the like. This is not limited herein.

When the multiplexer 42 is a waveguide multiplexer, a package structure is shown in FIG. 18. The second transistor-outline can 41 includes a second header 41*a* and a second cap 41*b*. A bearer structure 412 for bearing a waveguide multiplexer 42*a* is disposed on the second header 41*a*. The waveguide multiplexer 42*a* includes a first input terminal, a second input terminal, and an output terminal. Coupling and matching is performed on the first input terminal and the first optical transmitter 43, and coupling and matching is performed on the second input terminal and the second optical transmitter 44. The output terminal corresponds to the out-light hole 411 on the second transistor-outline can 41. The second cap 41*b* is configured to implement hermetic packaging. As shown in FIG. 17, optical signals emitted from the first optical transmitter 43 and the second optical transmitter 44 are multiplexed by the waveguide multiplexer 42*a* and then emitted by the out-light hole 411 on the second transistor-outline can 41.

As shown in FIG. 18, the first input terminal and the second input terminal may be respectively located on two opposite side walls of the waveguide multiplexer 42*a* and are perpendicular to an out-light direction of the output terminal. In this case, the sending optical path of the first optical transmitter 43 and the sending optical path of the second optical transmitter 44 are disposed in the out-light direction of the output terminal in a staggered manner, that is, a height difference is generated in a vertical direction as shown in FIG. 18. Therefore, mutual interference between light emitted by the first optical transmitter 43 and light emitted by the second optical transmitter 44 can be prevented.

Figure 19:
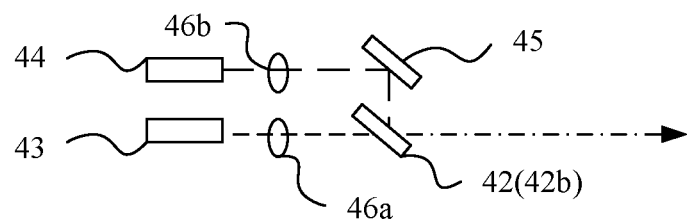
FIG. 19 is a schematic diagram of an optical path of a transmitter optical sub-assembly according to another embodiment of this application.

When the multiplexer 42 is a slide multiplexer, and the slide multiplexer can transmit the optical signal of the third wavelength and can reflect the optical signal of the fourth wavelength. A structure may be shown in FIG. 19 and FIG. 20. The first optical transmitter 43 and the second optical transmitter 44 are disposed side by side. Both the slide multiplexer 42*b* and the out-light hole 411 on the second transistor-outline can 41 are located on the sending optical path of the first optical transmitter 43. A fourth reflector 45 is disposed on the sending optical path of the second optical transmitter 44, and the fourth reflector may reflect, to the slide multiplexer 42*b*, the optical signal of the fourth wavelength that is emitted by the second optical transmitter 44. The slide multiplexer 42*b* can combine the optical signal of the third wavelength and the optical signal of the fourth wavelength, and send a combined optical signal to the out-light hole 411. The structure in which the slide multiplexer is used may enable the first optical transmitter 43 and the second optical transmitter 44 to be disposed side by side, to adapt to the existing TO packaging process.

Figure 20:
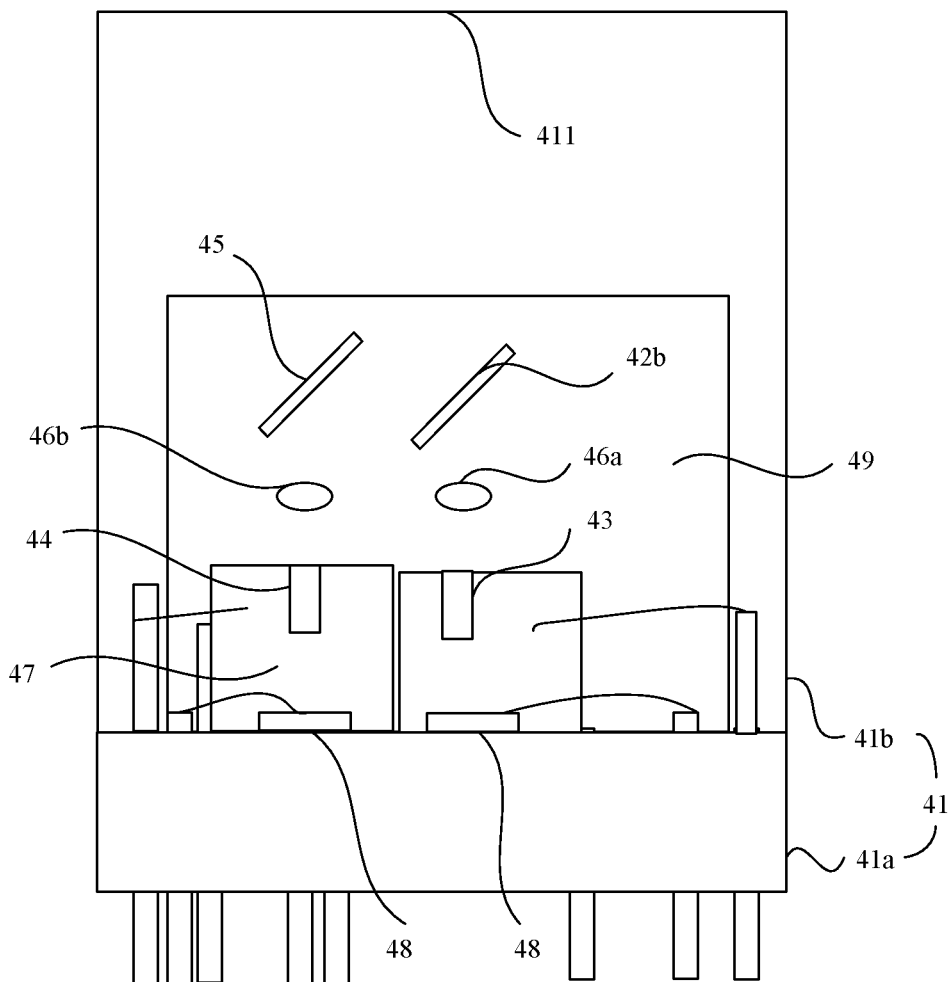
FIG. 20 is a schematic diagram of a package structure of a transmitter optical sub-assembly according to still another embodiment of this application.

To collimate emergent light, a collimation lens may be disposed. A location at which the collimation lens is disposed may be shown in FIG. 18. A collimation lens 46 is disposed at the out-light hole 411 on the second transistor-outline can 41. In this way, light can be emitted in a straight line from the out-light hole 411, to prevent an optical signal from a direction deviation. In addition, as shown in FIG. 20, a first collimation lens 46*a* may be disposed between the first optical transmitter 43 and the multiplexer, and a second collimation lens 46*b* may be disposed between the second optical transmitter 44 and the multiplexer. In this way, light can be emitted in a straight line from the first optical transmitter 43 and the second optical transmitter 44, to prevent an optical signal from a direction deviation.

The first optical transmitter 43 and the second optical transmitter 44 may be laser diodes.

Using transmit and receive wavelengths of the GPON and the XGPON as an example, the optical signal of the third wavelength may be an optical signal of a 1577-nm wavelength, and the optical signal of the fourth wavelength may be an optical signal of a 1490-nm wavelength. Alternatively, the optical signal of the third wavelength may be an optical signal of a 1490-nm wavelength, and the optical signal of the fourth wavelength may be an optical signal of a 1577-nm wavelength. In this way, optical signals of the GPON and the XGPON can be sent.

A transmission rate of the optical signal of a 1577-nm wavelength is high, and a heat amount of the optical transmitter is relatively large. Therefore, a cooled laser is required, to control an operating temperature of the optical transmitter, and prevent an excessively high temperature. As shown in FIG. 18 and FIG. 20, a temperature controller 47 may be disposed under a cooled laser corresponding to the 1577-nm wavelength, to adjust an operating temperature of the cooled laser using the temperature controller 47.

To monitor operating statuses of the first optical transmitter 43 and the second optical transmitter 44, as shown in FIG. 18 and FIG. 20, a monitor photodiode (MPD) 48 may be disposed. The monitor photodiode 48 is configured to monitor the operating statuses of the first optical transmitter 43 and the second optical transmitter 44. As shown in FIG. 18, for example, two monitor photodiodes 48 may be respectively disposed alongside the first optical transmitter 43 and the second optical transmitter 44. As shown in FIG. 20, the two monitor photodiodes 48 may alternatively be respectively disposed below the first optical transmitter 43 and the second optical transmitter 44.

A packaging process of a package structure shown in FIG. 20 is as follows: A carrier structure 49 is integrally formed on the second header 41*a*, and then the temperature controller and the laser carrier are disposed on the carrier structure 49. Two optical transmitters are separately surface-mounted on the carrier structure 49. The MPD 48 is directly disposed on the second header 41*a*. A lens is disposed above each of the two optical transmitters. The fourth reflector 45 is disposed above one lens, and the multiplexer is disposed above the other lens. Finally, the second cap 41*b* is used to implement hermetic packaging.

The foregoing implementation solutions of the receiver optical sub-assembly 3 and the transmitter optical sub-assembly 4 may all be applied to the combo bi-directional optical sub-assembly shown in FIG. 7, such that the combo bi-directional optical sub-assembly may be applicable to the existing BOSA package structure, and therefore, a tailored housing is not required. This reduces manufacturing costs, simplifies a packaging process, and meets an existing standard requirement for a size of an optical module. In addition, the structure is simple, an optical path is short, and coupling difficulty is low.

It should be noted that the combo bi-directional optical sub-assembly may alternatively use only the receiver optical sub-assembly 3 in the foregoing embodiment, and use two independent unpackaged transmitter optical sub-assemblies as the transmitter optical sub-assembly. Similarly, the combo bi-directional optical sub-assembly may alternatively use only the transmitter optical sub-assembly 4 in the foregoing embodiment, and use two independent unpackaged receiver optical sub-assemblies as the receiver optical sub-assembly.

For example, in a possible implementation, the combo bi-directional optical sub-assembly uses only the receiver optical sub-assembly 3 in the foregoing embodiment, and the two transmitter optical sub-assemblies may be separately installed instead of being packaged into a same transistor-outline can. In this case, two optical transmit ports may be disposed in the housing 1 in the combo bi-directional optical sub-assembly. An independent transmitter optical sub-assembly is disposed at each of the two optical transmit ports, where one transmitter optical sub-assembly is configured to send an optical signal of a third wavelength, and where the other transmitter optical sub-assembly is configured to send an optical signal of a fourth wavelength. A multiplexer is disposed on the optical transmission channel 11, and is configured to combine the optical signals sent by the two transmitter optical sub-assemblies for sending.

The combo bi-directional optical sub-assembly in any one of the foregoing embodiments is electrically connected to a peripheral electrical sub-assembly (ESA). Then a combination of the combo bi-directional optical sub-assembly and the peripheral electrical sub-assembly is disposed into an optical-module housing, to form a combo optical module.

For example, pins of the receiver optical sub-assembly and the transmitter optical sub-assembly in the bi-directional optical sub-assembly shown in FIG. 7 are electrically connected to a peripheral electrical sub-assembly (ESA). Then a combination of the bi-directional optical sub-assembly and the peripheral electrical sub-assembly is disposed into an optical-module housing, to form a combo optical module.

An optical line terminal is formed by connecting the foregoing combo optical module to a board and placing the combo optical module in a subrack.

Figure 21:
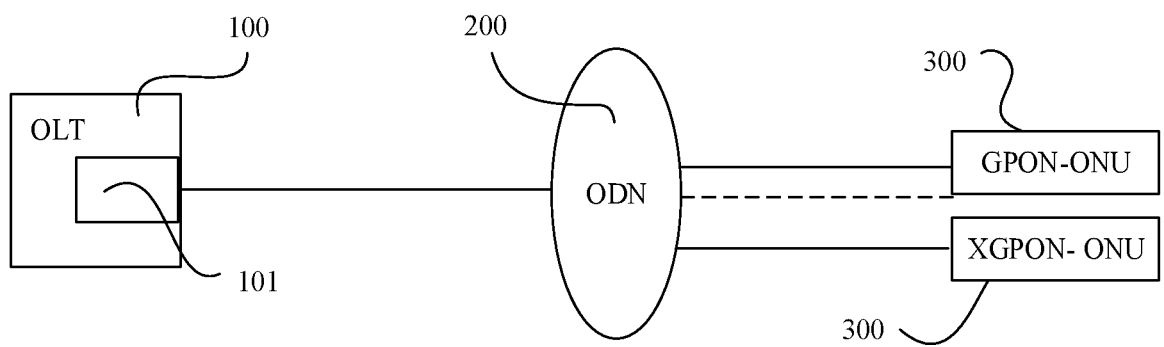
FIG. 21 is a networking structural diagram of a passive optical network system according to an embodiment of this application.

When the foregoing optical line terminal is applied to a passive optical network system, a structure of the passive optical network system is shown in FIG. 21, including: an optical line terminal 100, where a combo optical module 101 is disposed in the optical line terminal 100; an optical distribution network 200, where the optical distribution network 200 is connected to the optical line terminal 100; and a plurality of optical network units 300, where the plurality of optical network units 300 are connected to the optical distribution network 200.

Optical modules of some optical network units in the plurality of optical network units 300 are GPON optical modules, and optical modules of the other optical network units are XGPON optical modules.

Alternatively, optical modules of some optical network units in the plurality of optical network units 300 are EPON optical modules, and optical modules of the other optical network units are 10G-EPON optical modules.

According to the optical transmission module and the passive optical network system provided in the embodiments of this application, the combo optical module 101 can implement demultiplexing and receiving of upstream optical signals and multiplexing and sending of downstream optical signals. In addition, a housing structure of a combo bi-directional optical sub-assembly in the combo optical module 101 is applicable to an existing BOSA housing structure, such that a manufacturing and packaging process is easy to implement, complex manufacturing of an external tubal body is avoided, and manufacturing efficiency and a yield rate are improved. Therefore, construction costs of the optical transmission module and the passive optical network system are reduced.

In the descriptions of this specification, the described features, structures, materials, or characteristics may be combined in a proper manner in any one or more of the embodiments or examples.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A receiver optical sub-assembly comprising:
    a first demultiplexer disposed on a direction in which light enters the receiver optical sub-assembly and configured to:
        transmit a first optical signal of a first wavelength through a body of the first demultiplexer; and
        reflect a second optical signal of a second wavelength from a surface of the first demultiplexer;
    a first optical receiver disposed on a transmission optical path of the first demultiplexer and configured to receive the first optical signal of the first wavelength;
    an optical lens combination disposed on a reflection optical path of the first demultiplexer and configured to:
        receive the second optical signal of the second wavelength reflected by the first demultiplexer; and
        guide the second optical signal of the second wavelength; and
    a second optical receiver configured to receive the second optical signal of the second wavelength from the optical lens combination.

2. The receiver optical sub-assembly of claim 1, further comprising:
    a header; and
    a cap disposed on the header,
    wherein the first demultiplexer, the first optical receiver, the second optical receiver, and the optical lens combination are disposed inside the cap, and
    wherein the first optical receiver and the second optical receiver are coupled connected to the header.

3. The receiver optical sub-assembly of claim 1, further comprising a transparent support, wherein the transparent support includes a bottom plate and a roof plate, wherein the first demultiplexer is fastened on the bottom plate, and wherein the optical lens combination is fastened on the roof plate.

4. The receiver optical sub-assembly of claim 1, wherein the optical lens combination comprises a refractor and at least one reflector, wherein the refractor is disposed on the reflection optical path of the first demultiplexer, and wherein the second optical signal enters the second optical receiver after being reflected by the at least one reflector.

5. The receiver optical sub-assembly of claim 4, wherein the at least one reflector comprises a first reflector and a second reflector, wherein the refractor is disposed on the reflection optical path of the first demultiplexer, wherein the first reflector is disposed on a first refraction optical path of the refractor, and wherein the second reflector is disposed on a second reflection optical path of the first reflector.

6. The receiver optical sub-assembly of claim 5, further comprising:
    a first condenser lens and a first filter sequentially disposed on a receiving optical path of the first optical receiver in a light incident direction of the first optical receiver; and
    a second condenser lens and a second filter sequentially disposed on a second receiving optical path of the second optical receiver in a second light incident direction of the second optical receiver.

7. The receiver optical sub-assembly of claim 6, wherein the optical lens combination is an integrated optical prism comprising a refraction surface, a first reflection surface, and a second reflection surface disposed on the integrated optical prism, wherein the refraction surface is disposed on the reflection optical path of the first demultiplexer, wherein the first reflection surface is disposed on a refraction optical path of the refraction surface, wherein the second reflection surface is disposed on a third reflection optical path of the first reflection surface, and wherein a fourth reflection optical path of the second reflection surface coincides with the second receiving optical path of the second optical receiver.

8. The receiver optical sub-assembly of claim 7, wherein the first condenser lens is a first light concentrating surface on a surface of the integrated optical prism, wherein the second condenser lens is a second light concentrating surface on the surface of the integrated optical prism, wherein the first light concentrating surface corresponds to the first optical receiver, and second light concentrating surface corresponds to the second optical receiver.

9. The receiver optical sub-assembly of claim 8, wherein the first filter and the second filter are inserted into the integrated optical prism, wherein the first filter is located between the first light concentrating surface and the first optical receiver, and wherein the second filter is located between the second light concentrating surface and the second optical receiver.

10. The receiver optical sub-assembly of claim 7, further comprising an installation surface disposed on the integrated optical prism, wherein the first demultiplexer is fastened on the installation surface, and wherein the reflection optical path of the first demultiplexer passes through the refraction surface.

11. The receiver optical sub-assembly of claim 7, further comprising:
a header; and
a cap disposed on the header,
wherein the integrated optical prism is fastened on the header,
wherein an installation space exists between the integrated optical prism and the header, and
wherein the first optical receiver and the second optical receiver are disposed in the installation space and are coupled to the header.

12. The receiver optical sub-assembly of claim 11, wherein the header is coupled to pins, and wherein electrical signal output ends of the first optical receiver and the second optical receiver are coupled to the pins using an amplifier.

13. The receiver optical sub-assembly of claim 1, wherein the optical lens combination comprises at least one reflector, and wherein the second optical signal of the second wavelength enters the second optical receiver after being reflected by the at least one reflector.

14. The receiver optical sub-assembly of claim 1, wherein the first optical receiver and the second optical receiver are disposed side by side, and wherein a receiving optical path of the first optical receiver is parallel to a second receiving optical path of the second optical receiver.

15. The receiver optical sub-assembly of claim 1, wherein the first optical signal comprises a 1310-nanometer (nm) wavelength, and wherein the second optical signal comprises a 1270-nm wavelength.

16. The receiver optical sub-assembly of claim 1, wherein the first optical signal comprises a 1270-nanometer (nm) wavelength, and wherein the second optical signal comprises a 1310-nm wavelength.

17. A combo bi-directional optical sub-assembly, comprising:
a housing;
an optical transmission channel disposed in the housing;
a second demultiplexer disposed on the optical transmission channel, wherein an optical receive port, an optical transmit port, and an optical fiber connection port are in communication with the optical transmission channel and disposed in the housing; and
a receiver optical sub-assembly comprising:
a first demultiplexer disposed on a direction in which light enters the receiver optical sub-assembly and configured to:
transmit a first optical signal of a first wavelength through a body of the first demultiplexer; and
reflect a second optical signal of a second wavelength from a surface of the first demultiplexer;
a first optical receiver disposed on a transmission optical path of the first demultiplexer and configured to receive the first optical signal of the first wavelength;
an optical lens combination disposed on a reflection optical path of the first demultiplexer and configured to:
receive the second optical signal of the second wavelength reflected by the first demultiplexer; and
guide the second optical signal of the second wavelength; and
a second optical receiver configured to receive the second optical signal of the second wavelength from the optical lens combination.

18. The combo bi-directional optical sub-assembly of claim 17, wherein the optical transmission channel comprises:
a first optical channel coupling the optical transmit port and the optical fiber connection port; and
a second optical channel coupling the optical receive port and the first optical channel.

19. The combo bi-directional optical sub-assembly of claim 18, second demultiplexer is disposed at a junction of the first optical channel and the second optical channel.

20. An optical line terminal (OLT), comprising:
a receiver optical sub-assembly, wherein the receiver optical sub-assembly comprises:
a first demultiplexer disposed on a direction in which light enters the receiver optical sub-assembly and configured to:
transmit a first optical signal of a first wavelength through a body of the first demultiplexer; and
reflect a second optical signal of a second wavelength from a surface of the first demultiplexer;
a first optical receiver disposed on a transmission optical path of the first demultiplexer and configured to receive the first optical signal of the first wavelength;
an optical lens combination disposed on a reflection optical path of the first demultiplexer and configured to:
receive the second optical signal of the second wavelength reflected by the first demultiplexer; and
guide the second optical signal of the second wavelength; and
a second optical receiver configured to receive the second optical signal of the second wavelength from the optical lens combination.

* * * * *